US012289761B2

(12) United States Patent
Cao et al.

(10) Patent No.: US 12,289,761 B2
(45) Date of Patent: Apr. 29, 2025

(54) ELECTRONIC DEVICE AND METHOD FOR WIRELESS COMMUNICATION, AND COMPUTER-READABLE STORAGE MEDIUM

(71) Applicant: Sony Group Corporation, Tokyo (JP)

(72) Inventors: Jianfei Cao, Beijing (CN); Tao Cui, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 57 days.

(21) Appl. No.: 17/799,276

(22) PCT Filed: Apr. 2, 2021

(86) PCT No.: PCT/CN2021/085212
§ 371 (c)(1),
(2) Date: Aug. 12, 2022

(87) PCT Pub. No.: WO2021/204074
PCT Pub. Date: Oct. 14, 2021

(65) Prior Publication Data
US 2024/0188128 A1    Jun. 6, 2024

(30) Foreign Application Priority Data

Apr. 9, 2020 (CN) .......................... 202010275116.1

(51) Int. Cl.
*H04W 16/24* (2009.01)
*H04B 7/06* (2006.01)
(Continued)

(52) U.S. Cl.
CPC .... *H04W 74/0816* (2013.01); *H04B 7/06968* (2023.05); *H04W 16/28* (2013.01); *H04W 74/006* (2013.01)

(58) Field of Classification Search
CPC . H04B 7/06968; H04W 16/28; H04W 74/006
(Continued)

(56) References Cited

U.S. PATENT DOCUMENTS

| 9,641,230 B2* | 5/2017 | Park ..................... H04B 7/0408 |
| 2014/0105158 A1* | 4/2014 | Kim ..................... H04L 1/0038 |
| | | 370/329 |

(Continued)

FOREIGN PATENT DOCUMENTS

| CN | 109155651 A | 1/2019 |
| CN | 109788427 A | 5/2019 |

(Continued)

OTHER PUBLICATIONS

WO 2022154406 A, pp. 1-44, Jul. 21, 2022, LG Inc Method for carrying out channel access procedure, and apparatus therefor.*

(Continued)

*Primary Examiner* — Dang T Ton
(74) *Attorney, Agent, or Firm* — XSENSUS LLP

(57) ABSTRACT

Provided are an electronic device and a method for wireless communication, and a computer-readable storage medium. The electronic device comprises a processing circuit configured to: provide indication information to user equipment, the indication information being used to indicate a transmission beam used by the electronic device to transmit a downlink signal to the user equipment; and control transmission of the downlink signal according to the result of a first clear channel assessment performed by the user equipment using, on the basis of the indication information, a corresponding receiving beam. According to at least one aspect of embodiments of the present disclosure, for a transmission beam used by a base station to transmit downlink signals, user equipment uses a corresponding receiving beam to perform a clear channel assessment, so as to (Continued)

accurately determine whether the transmission beam can be used to transmit downlink signals to the user equipment.

18 Claims, 12 Drawing Sheets

(51) Int. Cl.
*H04W 16/28* (2009.01)
*H04W 74/00* (2009.01)
*H04W 74/0816* (2024.01)

(58) Field of Classification Search
USPC .................................. 370/329, 400, 405
See application file for complete search history.

(56) References Cited

U.S. PATENT DOCUMENTS

| | | | |
|---|---|---|---|
| 2016/0192341 A1* | 6/2016 | Park | H04B 7/0408 455/501 |
| 2019/0141693 A1 | 5/2019 | Guo et al. | |
| 2019/0335477 A1 | 10/2019 | Nam et al. | |

FOREIGN PATENT DOCUMENTS

| | | |
|---|---|---|
| CN | 110149720 A | 8/2019 |
| WO | WO-2019070471 A1 | 4/2019 |
| WO | WO-2020023773 A1 | 1/2020 |

OTHER PUBLICATIONS

CATT: "Channel Access Procedures for NR Unlicensed Operations", 3GPP Draft; R1-1806317. 3rd Generation Partnership Project (3GPP), Mobile Competence Centre ; 650, Route Des Lucioles ; F-06921 Sophia-Antipolis Cedex ; FRANCE vol. RAN WG1, No. Busan, Korea; May 21, 2018-May 25, 2018 May 20, 2018 (May 20, 2018), XP051441524.

International Search Report and Written Opinion mailed on Jun. 29, 2021, received for PCT Application PCT/CN2021/085212, filed on Apr. 2, 2021, 9 pages including English Translation.

Apple Inc., "Discussion on beam measurement and reporting", 3GPP TSG RAN WG1 Meeting #92bis, R1-1804770, Apr. 16-20, 2018, pp. 1-8.

* cited by examiner

ELECTRONIC DEVICE AND METHOD FOR WIRELESS COMMUNICATION, AND COMPUTER-READABLE STORAGE MEDIUM

CROSS-REFERENCE TO RELATED APPLICATIONS

The present application is based on PCT filing PCT/CN2021/085212, filed Apr. 2, 2021, which claims priority to Chinese Patent Application No. 202010275116.1, titled "ELECTRONIC DEVICE AND METHOD FOR WIRELESS COMMUNICATION, AND COMPUTER-READABLE STORAGE MEDIUM", filed on Apr. 9, 2020 with the China National Intellectual Property Administration, which is incorporated herein by reference in its entirety.

FIELD

The present disclosure relates to the technical field of wireless communication, and in particular to an electronic device and a method for wireless communication, with which clear channel state assessments are performed for downlink signals in a scenario of using an unlicensed frequency band, and a non-transitory computer-readable storage medium.

BACKGROUND

In recent researches, an application of New Radio (NR) systems operating in unlicensed frequency bands in a high frequency band (mm-band) is proposed. For an unlicensed frequency band, different systems have fair rights to use a spectrum. Therefore, in order to avoid unnecessary interference, base stations of each system are generally configured to perform a Clear Channel Assessment (CCA) or Listen Before Talk (LBT) before transmitting downlink signals using the unlicensed spectrum, in order to determine whether the spectrum is being occupied at a current moment. In the LBT mechanism currently defined by 3GPP, FR1 (a low frequency band) technology is discussed, and therefore when downlink signals are transmitted by the base stations, reception beams with a wider spatial coverage are used on a base station side by default to perform an LBT operation.

However, for NR systems operating in a high frequency band (mm-band), the base stations may perform beamforming to concentrate powers of to-be-transmitted downlink signals onto transmission beams in certain directions, so as to prevent strong path loss. In a case that a reception beam with a wider spatial coverage is still used for a clear channel assessment or LBT, even if strong reception signal energy is obtained, it is still impossible to determine which direction the energy is coming from, and a chance for performing communication by using certain beams may be wasted. In addition, since there may be a certain spatial distance between a base station and a user equipment, a result of the clear channel assessment for a base station side may not accurately reflect a channel state on a user equipment side.

SUMMARY

A brief summary of the present disclosure is provided below, in order to provide a basic understanding of certain aspects of the present disclosure. It should be understood that this summary is not an exhaustive overview of the present disclosure, and is not intended to identify key or essential parts of the present disclosure or to limit the scope of the present disclosure. This section is provided to present some concepts in a simplified form as a prelude to the more detailed description discussed later.

In view of the above problems, an objective of at least one aspect of the present disclosure is to provide an electronic device and method for wireless communication, and a non-transitory computer-readable storage medium, which enables a clear channel assessment at a user equipment side using a corresponding reception beam for a transmission beam for transmitting a downlink signal by a base station, thereby providing a more accurate result of the channel assessment, and enabling better transmission of a downlink signal.

According to an aspect of the present disclosure, an electronic device for wireless communication is provided. The electronic device includes processing circuitry configured to: provide indication information to user equipment, the indication information indicating a transmission beam for transmitting a downlink signal to the user equipment; and control the transmission of the downlink signal according to a result of a first clear channel assessment that is performed at the user equipment using a corresponding reception beam based on the indication information.

According to another aspect of the present disclosure, an electronic device wireless communication is provided. The electronic device includes processing circuitry configured to: obtain indication information from a base station, the indication information indicating a transmission beam for transmitting a downlink signal to user equipment; and perform, based on the indication information, a first clear channel assessment using a corresponding reception beam.

According to a further aspect of the present disclosure, a method for wireless communication is provided. The method includes: providing indication information to user equipment, the indication information indicating a transmission beam for transmitting a downlink signal to the user equipment; and controlling the transmission of the downlink signal according to a result of a first clear channel assessment that is performed at the user equipment using a corresponding reception beam based on the indication information.

According to yet another aspect of the present disclosure, a method for wireless communication is provided. The method includes: obtaining indication information from a base station, the indication information indicating a transmission beam for transmitting a downlink signal to user equipment; and performing, based on the indication information, a first clear channel assessment using a corresponding reception beam.

According to yet another aspect of the present disclosure, a non-transitory computer-readable storage medium storing executable instructions is provided. The executable instructions, when executed by a processor, cause the processor to perform the method for wireless communication or functions of the electronic device for wireless communication.

According to other aspects of the present disclosure, there are further provided computer program codes and computer program products for implementing the method according to the above embodiments of the present disclosure.

According to at least one aspect of the embodiments of the present disclosure, for the transmission beam for transmitting a downlink signal by the base station, clear channel assessment using a corresponding reception beam is performed at the user equipment side, so as to accurately determine whether the transmission beam is available for transmitting the downlink signal to the user equipment.

Other aspects of embodiments of the present disclosure are given in the following specification, in which preferred embodiments for fully disclosing embodiments of the present disclosure are described in detail without imposing limitations to the present disclosure.

BRIEF DESCRIPTION OF THE DRAWINGS

The drawings are described herein for illustrating selected embodiments rather than all possible embodiments, and are not intended to limit the scope of the present disclosure. In the drawings.

Figure 1:
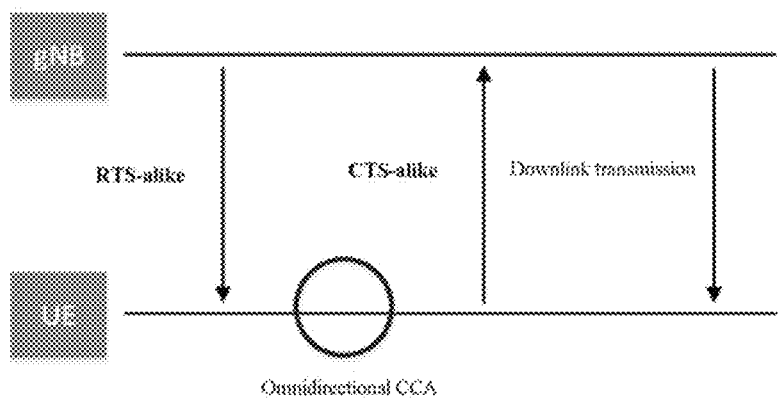
FIG. 1 is a schematic diagram illustrating a process of performing a clear channel assessment at a user equipment side serving as a receiver.

Although the present disclosure is susceptible to various modifications and alternatives, specific embodiments of the present disclosure are shown in the drawings by way of examples and are described in detail herein. However, it should be understood that description of the specific embodiments herein is not intended to limit the present disclosure to the specific forms disclosed, but to cover all modifications, equivalents and alternatives that fall within the spirit and scope of the present disclosure. It should be noted that same or similar reference numerals throughout the drawings indicate the same or like components.

DETAILED DESCRIPTION OF EMBODIMENTS

The embodiments of the present disclosure are described completely with reference to the drawings. The following description is merely exemplary, and is not intended to limit the present disclosure and application or use thereof.

Exemplary embodiments are provided so that the present disclosure is thorough and fully convey the scope thereof to those skilled in the art. Numerous specific details, such as examples of specific components, devices, and methods, are set forth to provide a comprehensive understanding of the embodiments of the present disclosure. It is apparent to those skilled in the art that the exemplary embodiments may be implemented in many different forms without specific details, and should be construed as limiting the scope of the present disclosure. In some exemplary embodiments, well-known processes, well-known structures, and well-known technologies are not described in detail.

The description is made in the following order:
1. Description of problem;
2. Examples of a configuration of an electronic device on the base station side;
    2.1 A first example of the configuration of the electronic device on the base station side;
    2.2 A second example of the configuration of the electronic device on the base station side;
    2.3 Examples of indication information provided by a provision unit of the electronic device on the base station side;
    2.4 Examples of manners in which the provision unit of the electronic device on the base station side provides the indication information;
3. Examples of a configuration of an electronic device on the user equipment side;
    3.1 An example of the configuration of the electronic device on the user equipment side;
    3.2 Examples of manners in which an acquisition unit of the electronic device on the user equipment side obtains the indication information;

4. Method embodiments;
   4.1 Method embodiments on the base station side;
   4.2 Method embodiments on the user equipment side;
5. Application examples.

1. Description of the Problem

For unlicensed frequency bands, in order to avoid unnecessary interference, base stations of systems are generally configured to perform Clear Channel Assessment (CCA) or Listen Before Talk (LBT) before transmitting a downlink signal using unlicensed spectrum, so as to determine whether the spectrum is being occupied at a current time. In the LBT mechanism currently defined by 3GPP, the FR1 (a low frequency band) technology is discussed, and therefore when downlink signals are transmitted by a base station, reception beams with wider spatial coverage (hereinafter also referred to as omnidirectional) are used by default to perform an LBT operation.

Since there may be a certain spatial distance between the base station and the user equipment, a result of the clear channel assessment on the base station side may not accurately reflect a channel state on the user equipment side. To this end, a method for performing a clear channel assessment at the user equipment side is proposed. FIG. 1 is a schematic diagram illustrating a process of performing a clear channel assessment at a user equipment side serving as a receiver, in which an example of a process of a clear channel assessment performed at a user equipment UE before a base station gNB transmits a downlink signal is shown. As shown in FIG. 1, the base station gNB first transmits, to the user equipment UE, a requesting-transmission-alike signal RTS-alike, which is used to indicate a request for transmission, so as to inform the UE that a downlink transmission is to be performed. After receiving the RTS-alike signal, the UE uses an omnidirectional reception beam to perform a clear channel assessment (hereinafter also referred to as omnidirectional clear channel assessment). If finding that the downlink channel is clear, the UE transmits a result to the gNB in a form of a clear-to-send-alike signal CTS-alike indicating permission of the transmission, and the gNB performs the downlink transmission accordingly; otherwise, the transmission is terminated.

In a case of using the FR1 (a low frequency band) technology, the exemplary process shown in FIG. 1 is beneficial to reflecting a channel state on the user equipment side. However, for NR systems operating in a high frequency band (mm-band), the base station may perform beamforming to concentrate powers of to-be-transmitted downlink signals onto transmission beams in certain directions, so as to prevent strong path loss. In a case that the omnidirectional reception beam is still used for a clear channel assessment or LBT, even if a strong reception signal energy is obtained, it is still impossible to determine which direction the energy is coming from, and a chance for performing communicate by using certain beams may be wasted.

Therefore, for a scenario where a NR system operating in millimeter waves and downlink signals are transmitted with specific beams (directional beams, rather than omnidirectional beams) through beamforming and other scenarios, it is desired to provide a more targeted and accurate manner for the clear channel assessment.

The present disclosure proposes, for such scenarios, an electronic device on a base station side, an electronic device on a user equipment side, a method for wireless communication, and a computer-readable storage medium, which enable a clear channel assessment at a user equipment side using a corresponding reception beam for a transmission beam for transmitting a downlink signal by a base station, thereby providing a more accurate result of the channel assessment, and enabling better transmission of a downlink signal.

The electronic device on a base station side according to the present disclosure may be a base station device, such as an eNB (evolved node B) or a gNB. In addition, the electronic device on a base station side according to the present disclosure may include an electronic device on a network side other than the base station device, which theoretically may be any type of TRP (Transmit and Receive Port). The TRP may have functions of transmitting and receiving, for example, the TRP may receive information from the user equipment and the base station device, and may transmit information to the user equipment and the base station device. In an example, the TRP may serve the user equipment and be controlled by the base station device. That is, the base station device provides services to the user equipment through TRP. In some specific embodiments or examples below; the base station device is directly described as an example of the electronic device on a base station side, but the present disclosure is not limited to the base station device, but may be appropriately applied to the above-mentioned situation of the electronic device on a network side.

The electronic device on a user equipment side according to the present disclosure may include various user equipment, such as mobile terminals such as smartphones, tablet personal computers (PCs), notebook PCs, portable game terminals, portable/dongle type mobile routers and digital cameras) or in-vehicle terminals (such as a car navigation device). The user equipment may also be implemented as a terminal (also referred to as a machine-type communication (MTC) terminal) that performs machine-to-machine (M2M) communication. Furthermore, the user equipment may be a wireless communication module (such as an integrated circuit module comprising a single die) mounted on each of the above-mentioned terminals.

2. Examples of a Configuration of an Electronic Device on the Base Station Side

[2.1 a First Example of the Configuration of the Electronic Device on the Base Station Side]

Figure 2:
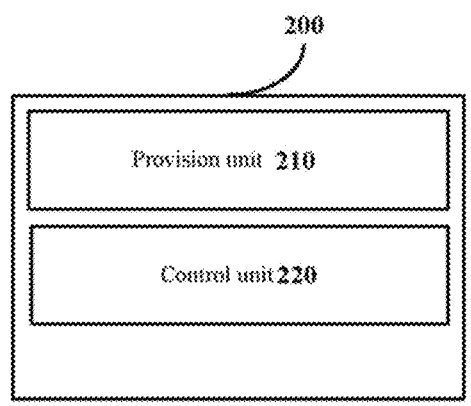
FIG. 2 is a block diagram showing a first configuration example of an electronic device on a base station side according to an embodiment of the present disclosure.

FIG. 2 is a block diagram showing a first example of a configuration of an electronic device on a base station side according to an embodiment of the present disclosure.

As shown in FIG. 2, the electronic device 200 may include a provision unit 210 and a control unit 220.

Here, each unit of the electronic device 200 may be included in a processing circuit. It should be noted that the electronic device 200 may include a single or multiple processing circuits. Further, the processing circuitry may include various discrete functional units to perform various different functions and/or operations. It should be noted that these functional units may be physical entities or logical entities, and units with different names may be implemented by a same physical entity.

According to an embodiment of the present disclosure, the provision unit 210 may provide indication information to a user equipment, where the indication information indicates a transmission beam for transmitting a downlink signal to the user equipment by the electronic device. The control unit 220 may control the transmission of the downlink signal according to a result of a first clear channel assessment that is performed at the user equipment using a corresponding reception beam based on the indication information.

The electronic device 200 may transmit downlink signals to the user equipment by using one or more transmission beams. Correspondingly, the indication information provided by the provision unit 210 may be used to indicate the one or more transmission beams for transmitting downlink signals by the electronic device.

In a case of using beamforming for communication, the transmission beam of a transmitter corresponds to the reception beam of the receiver, that is, there is a beam correspondence between the beams. Therefore, using the indication information from the provision unit 210, the user equipment may perform a first clear channel assessment using a reception beam (hereinafter also referred to as a corresponding reception beam when appropriate) corresponding to the transmission beam indicated by the indication information. Different from the omnidirectional clear channel assessment performed using omnidirectional reception beams in the conventional technology, the clear channel assessment performed using the corresponding reception beam based on the indication information (information about the transmission beam) in the present disclosure may also be referred to as directional (directive) clear channel assessment.

The user equipment may implement the directional first clear channel assessment through various appropriate manners. For example, the user equipment may perform a directional (directivity) LBT based on the indication information. The user equipment monitors, based on the transmission beam indicated by the indication information, an energy of the corresponding reception beam within a predetermined time period, and determines that a signal is received through the reception beam in response to the energy exceeding a predetermined threshold, and thereby determines that there is no clear channel for the transmission beam indicated by the indication information. On the contrary, the user equipment determines that no signal is received through the reception beam in response to the energy being less than or equal to the predetermined threshold, and thereby determines that there is a clear channel for the transmission beam indicated by the indication information. Such LBT may be specifically implemented through various appropriate manners, such as a manner similar to the Cat.2 LBT mechanism or the Cat.4 LBT mechanism defined by the IEEE standard, which is not limited herein and is not repeated here.

In a case that the indication information provided by the provision unit 210 indicates the transmission beam for transmitting a downlink signal, the user equipment may perform a first clear channel assessment for the transmission beam using the corresponding reception beam, and report a result of the first clear channel assessment performed for the transmission beam to the electronic device 200. In this case, an overhead of the user equipment reporting the result to the electronic device is relatively small, where only one bit may be used to indicate whether a clear channel exists for the transmission beam. Such a report may be transmitted in a physical uplink control channel (PUCCH) format that occupies less resources, for example, in a manner similar to a scheduling request (SR).

Correspondingly, at the electronic device 200 on a base station side, the control unit 220) may control to transmit the downlink signal using the transmission beam for which a clear channel exists, in a case that the first clear channel assessment obtained from the user equipment indicates that there is a clear channel for the transmission beam; otherwise, the control unit 220 controls not to transmit the downlink signal using the transmission beam.

On another hand, in a case that the indication information provided by the provision unit 210 indicates multiple transmission beams for transmitting downlink signals, the user equipment may perform the first clear channel assessment using a corresponding reception beam for each of the transmission beams for transmitting a downlink signal, and report a result of the assessment to the electronic device 200. In this case, the user equipment may feed back the result to the electronic device in two manners, depending on requirements of the electronic device 200 on the base station side for strictness of the clear channel assessment.

A first manner is suitable for a situation where the electronic device 200 on the base station side implements strict criteria for the clear channel assessment. The strict criteria refers to that as long as the result of the first clear channel assessment performed by the user equipment for any reception beam indicates that no clear channel exists, the base station side determines that the spectrum is not clear currently, that is, no clear channel exists for any of the transmission beams indicated by the indication information. In other words, only when the result of the first clear channel assessment performed by the user equipment for each reception beam indicates existence of a clear channel, the electronic device 200 on the base station side determines that there are clear channels. For the strict criteria, the user equipment only feeds back an overall result of the clear channel assessment for the multiple transmission beams using one bit. For example, the user equipment may determine a positive overall result of the clear channel assessment only when results of the first clear channel assessment for each of the transmission beams all indicate existence of a clear channel, and the result is represented by bit 1; otherwise, the result is represented by bit 0). Such a report may be transmitted in a PUCCH format that occupies less resource, for example, in a manner similar to a scheduling request (SR).

Correspondingly, at the electronic device 200 on the base station side, the control unit 220 may control to transmit the downlink signals using the transmission beams, in a case that the first clear channel assessment obtained from the user equipment indicates that there is a clear channel for each of the transmission beams; otherwise, the control unit 220 controls not to transmit the downlink signals using the transmission beams.

Another manner is suitable for a situation where the electronic device 200 on the base station side implements less strict criteria for the clear channel assessment. The less strict refers to that when the result of the first clear channel assessment performed by the user equipment for a reception beam indicates existence of a clear channel, the base station side determines that the reception beam has an clear channel, regardless of the result of the first clear channel assessment by the user equipment for another reception beam. In such case, the user equipment reports, to the base station side, results of the first clear channel assessment performed for each of the transmission beams for transmitting downlink signals. Such a report may be transmitted, for example, by a bit sequence of a form {1, 0, 1, 1, 1}. A length of the bit sequence is equal to the number of transmission beams indicated by the indication information. Bits in the bit sequence indicate, in a predetermined order, whether there is a clear channel for a corresponding one of the transmission beams by 1 or 0. Such bit sequence is transmitted using a PUCCH format that occupies more resources.

Correspondingly, at the electronic device 200 on the base station side, the control unit 220 may determine, based on the bit sequence obtained from the user equipment, that clear channel(s) exists for the transmission beam(s) corresponding to bit 1 in the bit sequence of the form of {1, 0, 1, 1 . . . , 1}, for example, and control to transmit the downlink signal(s) using such transmission beam(s). In a case that a bit sequence in which bits are all 0 is obtained from the user equipment, it indicates that there is no clear channel for any of the transmission beams, and the control unit 220 controls not to transmit the downlink signals using the transmission beams.

Figure 3:
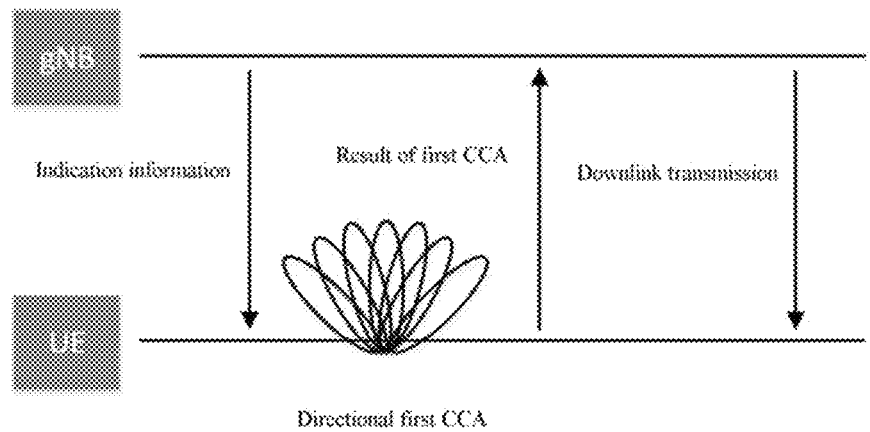
FIG. 3 is a schematic diagram showing an example of a wireless communication process including a clear channel assessment that may be performed by the electronic device shown in FIG. 2.

FIG. 3 is a schematic diagram illustrating an example of a wireless communication process including the clear channel assessment that is performed by the electronic device in FIG. 2. In the example shown in FIG. 3, the electronic device 200 serves as a base station gNB, which implements an exemplary process of wireless communication including a clear channel assessment together with the user equipment UE. As shown in FIG. 3, the base station gNB first transmits indication information to the user equipment UE to indicate a transmission beam for transmitting a downlink signal to the user equipment. After receiving the indication information, the UE performs a directional first clear channel assessment using a corresponding reception beam at an appropriate timing based on the indication information, and reports a result of the first clear channel assessment to the base station gNB. Next, the base station gNB transmits the downlink signal by using the transmission beam corresponding to the clear channel in response to the result of the first clear channel assessment indicating existence of the clear channel.

Note that FIG. 3 shows the result of the first clear channel assessment indicating existence of a clear channel. In a case that the result indicates that no clear channel exists, the base station gNB does not perform the transmission of the downlink signal shown on the most right in the figure. In addition, although FIG. 3 shows that the UE explicitly feeds back the result of the first clear channel assessment by reporting the result, the result of the assessment performed by the UE is not necessarily reported to the gNB. For example, in a case that the result is negative (no clear channel exists), no report may be transmitted (implicit feedback). Therefore, controls by the base station gNB on the transmission of the downlink signal according to the result of the clear channel assessment include not performing the transmission in a case where no report is received within a predetermined time.

Described above is the first example of the configuration of the electronic device on the base station side according to an embodiment of the present disclosure. In this configuration example, the electronic device on the base station side can provide indication information to a user about a transmission beam for transmitting a downlink signal by the base station. The user equipment side can perform a clear channel assessment using a corresponding reception beam. The electronic device on the base station side can control the transmission of the downlink signal according to the result of the clear channel assessment.

[2.2 Second Configuration Example of an Electronic Device on the Base Station Side]

Figure 4:
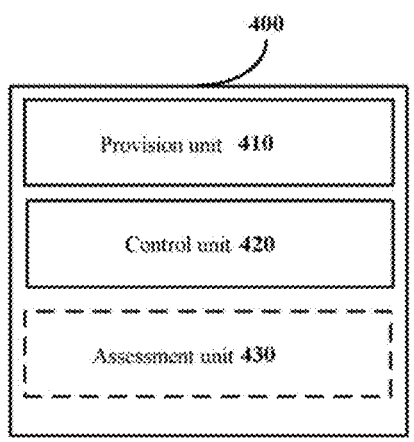
FIG. 4 is a block diagram showing a second configuration example of an electronic device on a base station side according to an embodiment of the present disclosure.

FIG. 4 is a block diagram showing a second configuration example of the electronic device on the base station side according to an embodiment of the present disclosure. The second configuration example shown in FIG. 4 is a further improved example based on the first configuration example shown in FIG. 2, and the following description is made on the basis of the description of the first configuration example shown in FIG. 2.

As shown in FIG. 4, the electronic device 400 may include a provision unit 410 and a control unit 420, which are similar to the provision unit 210 and the control unit 220 in the electronic device 200 shown in FIG. 2, respectively. In addition, the electronic device 400 further includes an assessment unit 430, which is configured to: perform, for the transmission beam for transmitting the downlink signal, a second clear channel assessment using a corresponding reception beam. Correspondingly, the control unit 420 may control the transmission of the downlink signal according to the result of the first clear channel assessment obtained from the user equipment and a result of the second clear channel assessment by the assessment unit 430.

The assessment unit 430 of the electronic device 400 may implement the directional second clear channel assessment through various appropriate manners. For example, the assessment unit 430 may monitor the energy of the corresponding reception beam within a predetermined time period for the transmitting beam for transmitting a downlink signal, and determine that a signal is received through the reception beam in response to the energy exceeding a predetermined threshold, and thereby determines that there is no clear channel for the transmission beam indicated by the indication information. On the contrary, the assessment unit 430 determines that no signal is received through the reception beam in response to the energy being less than or equal to the predetermined threshold, and thereby determines that there is a clear channel for the transmission beam indicated by the indication information. Such LBT may be specifically implemented through various appropriate manners, such as a manner similar to the Cat.2 LBT mechanism or the Cat.4 LBT mechanism defined by the IEEE standard, which is not limited herein and is not repeated here.

Alternatively, the control unit 520 may be configured to: when the result of the first clear channel assessment and/or the result of the second clear channel assessment indicates that there is a clear channel, transmit the downlink signal using a transmission beam corresponding to the clear channel.

In other words, for the result of the first clear channel assessment by the user equipment side and the result of the second clear channel assessment by the base station side, the control unit 520 may determine whether there is a clear channel for a corresponding transmission beam by using an "AND" or "OR" operation. The "AND" operation determines that there is a clear channel for a given transmission beam in response to both of the two results for the transmission beam indicating existence of the clear channel; and the "OR" operation determines that there is a clear channel for a given transmission beam in response to either of the two results for the transmission beam indicating existence of the clear channel. The control unit 420 of the electronic device 400 may select the "AND" operation to avoid using occupied transmission beams as much as possible (avoiding a "pseudo-clear" result), or select the "OR" operation to eliminate a "pseudo-occupancy." result in the results of the clear channel assessment as much as possible, depending on different considerations on the channel assessment.

Optionally, the assessment unit 430 is further configured to: control to perform the second clear channel assessment for the corresponding transmission beam according to the result of the first clear channel assessment at the user equipment.

For example, in a case that the electronic device 400 only expects to transmit a downlink signal using one transmission beam (the indication information provided by the provision unit 210 indicates one transmission beam for transmitting a downlink signal), the assessment unit 430 may perform the second clear channel assessment for the transmission beam only when the result of the first clear channel assessment for the transmission beam indicates that there is an clear channel; otherwise, the assessment unit 430 does not perform the second clear channel assessment. Similarly, in a case that the electronic device 400 expects to transmit downlink signals using multiple transmission beams (the indication information provided by the provision unit 210 indicates multiple transmission beams for transmitting downlink signals) and obtains the result of the first clear channel assessment for each of the transmission beams from the user equipment, the assessing unit 430 may perform the second clear channel assessment only for the transmission beam(s) for which the first result of the clear channel assessment obtained from the user equipment indicates that there is a clear channel (for example, the transmission beams corresponding to bit 1 in the result of the first clear channel assessment in a form of a bit sequence), and not perform the second clear channel assessment for the remaining transmission beam(s). In this way, the assessment unit 430 can perform the second clear channel assessment only when necessary, so that the throughput is reduced.

Figure 5:
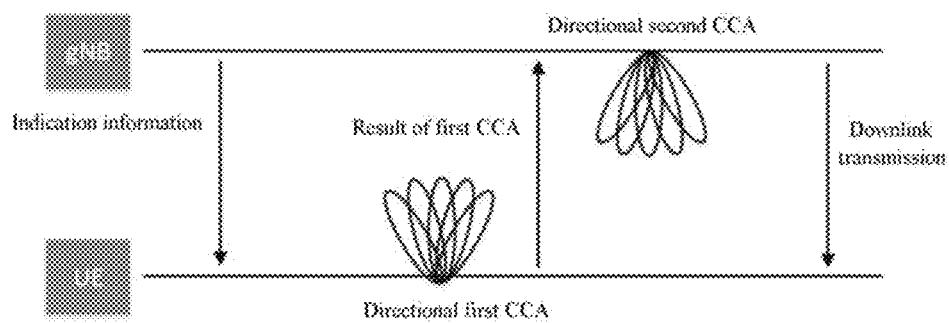
FIG. 5 is a schematic diagram illustrating a wireless communication process including a clear channel assessment that may be performed by the electronic device shown in FIG. 4.

FIG. 5 is a schematic diagram illustrating an example of a wireless communication process including the clear channel assessment that may be performed by the electronic device in FIG. 4. In the example shown in FIG. 5, the electronic device 400 serves as a base station gNB, which implements an exemplary process of wireless communication including a clear channel assessment together with the user equipment UE. As shown in FIG. 5, the base station gNB first transmits indication information to the user equipment UE to indicate a transmission beam for transmitting a downlink signal to the user equipment. After receiving the indication information, the UE performs a directional first clear channel assessment using a corresponding reception beam at an appropriate timing based on the indication information, and reports a result of the first clear channel assessment to the base station gNB. Next, the base station gNB performs a second clear channel assessment for the corresponding transmission beam, makes a comprehensive determination according to the result of the first clear channel assessment and the result of the second clear channel assessment, and controls the transmission of the downlink signal using the corresponding transmission beam. Note that FIG. 5 shows a situation where the comprehensive determination result indicates that there is a clear channel; while in a case that the result indicates that there is no clear channel, the base station gNB does not perform the transmission of the downlink signal shown on the most right in the figure.

Described above is the second configuration example of the electronic device on the base station side according to an embodiment of the present disclosure. As described above, in the second configuration example, the assessment unit of the electronic device may further perform the second clear channel assessment, so that the control unit of the electronic device may make a comprehensive determination according to the result of the first clear channel assessment and the result of the second clear channel assessment, and control to transmit the downlink signal using the corresponding transmission beams. Thereby, the use of occupied transmission beam or "pseudo-occupancy" results in the results of the clear channel assessment may be avoided as much as possible by selecting criteria for the comprehensive determination.

[2.3 Examples of Indication Information Provided by the Provision Unit of the Electronic Device on the Base Station Side]

Next, an example of the indication information provided by the provision unit of the electronic device, such as the electronic device 200 or 400, according to an embodiment of the present disclosure is described.

In an example, the indication information provided by the indication unit of the electronic device may include a radio resource control (RRC) parameter capable of indicating the transmission beam. Preferably, the RRC parameter indicates a transmission beam used by a predetermined downlink reference signal by indicating the predetermined downlink reference signal.

An example of the RRC parameter is an ID of a TCI state defined in the Transmission Configuration Indication (TCI) mechanism in 3GPP TS 38.331.

For the convenience of explanation, the related concepts of the TCI mechanism are briefly introduced. The TCI mechanism is based on a TCI state table which is pre-configured for the user equipment by the base station through RRC high-layer signaling. A TCI state table may include pre-configured M TCI states, where M is an integer greater than 1, such as 64 or 128. Each TCI state includes: a TCI state ID (TCI-StateId); one or two quasi-co-location (QCL) type indicators for indicating QCL types selected from four types, i.e., QCL-Type A, QCL-Type B, QCL-Type C, and QCL-Type D; and an index of a reference signal indicated for each QCL type, which represents a previously transmitted reference signal. For downlink transmission, the index of the previously transmitted reference signal indicated in the TCI state may be an index or number of a channel state information-reference signal (CSI-RS) or a synchronization signal block (SSB) which is previously transmitted.

The Quasi-co-location is a concept cited in the NR standard, which is used to indicate that the channels experienced by the signals transmitted by antenna ports have similar large-scale characteristics. In other words, two antenna ports with a quasi-co-location relationship have similar large-scale characteristics. In addition, two signals transmitted by two antenna ports having a quasi-co-location relationship may be generally referred to as having a quasi-co-location relationship. The similar large-scale characteristics represented by each quasi-co-location type are as follows.

QCL-Type A: {Doppler shift, Doppler spread, Average delay, Delay spread}
QCL-Type B: {Doppler shift, Doppler spread}
QCL-Type C: {Average Delay, Doppler shift}
QCL-Type D: {Spatial reception parameters}

In practical applications, the spatial reception parameters being similar represented by of the spatial quasi-co-location of QCL-type D involves that two signals with spatial quasi-co-location are transmitted through the transmission beams in a same direction. Therefore, for a first signal and a second signal that satisfy the spatial quasi-colocation, if the first signal using a specific transmission beam can be received by the receiver through a corresponding reception beam, the second signal using the same transmission beam can also be received by the receiver through the same reception beam.

After understanding the related concepts of the TCI mechanism, it may be understood that for a TCI state in the pre-configured TCI state table, if the QCL type of the TCI state includes a QCL-type D representing spatial quasi-colocation, then the index of the reference signal indicated for the QCL-type D substantially indicates the transmission beam used by the reference signal.

Therefore, in the present disclosure, the provision unit of the electronic device on the base station side can include such a TCI state (more specifically, the TCI state ID) in the indication information, for indicating the transmission beam for transmitting a downlink signal subsequently. That is, the transmission beam for the downlink signal is the same as the transmission beam used by the reference signal indicated for the QCL-type D in the TCI state corresponding to the TCI state ID. Correspondingly, the user equipment may receive the downlink signal using a reception beam for the reference signal. In this way, the electronic device on the base station side does not need to indicate to the user equipment the details of the downlink beamforming for transmitting the downlink signal, and the user equipment only needs to receive the downlink signal using the reception beam for the indicated previous reference signal.

The above describes an example in which the indication information provided by the provision unit of the electronic device according to the embodiment of the present disclosure includes an RRC parameter such as the TCI state ID.

[2.4 Example of a Manner in which the Provision Unit of the Electronic Device on the Base Station Side Provides Indication Information]

Next, the manner in which the provision unit of the electronic device, such as the above electronic device 200 or 400, provides the indication information according to an embodiment of the present disclosure is described in conjunction with the situation where the indication information includes the RRC parameter such as the TCI state ID.

More specifically, considering time domain characteristics (including but not limited to being periodic, semi-persistent, aperiodic, and the like) of downlink reference signals and downlink data signals to be transmitted by the electronic device on the base station side, manners of providing the indication information suitable for downlink signals with different time domain characteristics are provided below. In the following description, other characteristics other than the time domain characteristics of the signals are generally ignored, for example, purpose of the downlink reference signals is ignored (such as no matter the CSI-RS is used for downlink beam management, CSI acquisition or mobility management), and related description is made mainly based on the time-domain characteristics.

(2.4.1 Example of Periodic Downlink Signal)

In this example, a periodic downlink signal is considered. In this case, the downlink signal may include a downlink reference signal or a downlink data signal, which is preconfigured to be periodically transmitted, and the provision unit of the electronic device on the base station side may be configured to provide the indication information to the user equipment through high-layer signaling of the downlink reference signal or the downlink data signal.

First, description is made using an example of the downlink reference signal that is periodically transmitted. The periodically transmitted downlink reference signal may include a periodic CSI-RS or an SSB signal specifically configured for the user equipment. When the electronic device on the base station side performs an RRC configuration for the periodically transmitted CSI-RS or SSB, the user equipment can be notified, through high-layer signaling such as RRC signaling (hereinafter sometimes referred to as RRC configuration information), of predetermined time domain and frequency domain resources for transmitting the CSI-RS or SSB, and the indication information indicating the transmission beam for transmitting the CSI-RS or SSB may be provided at a same time.

As an example, the indication information provided to the user equipment through the high-layer signaling of the downlink reference signal may include the TCI state ID under the TCI mechanism described above. For a periodically transmitted CSI-RS signal, the electronic device on the base station side can configure a parameter qcl-InfoPeriodicCSI-RS for indicating a periodic beam in RRC signaling part NZP-CSI-RS-Resource for configuring a CSI-RS resource set where the CSI-RS signal is located, that is, determining the TCI state ID corresponding to the qcl-InfoPeriodicCSI-RS parameter, as the indication information provided to the user equipment. Correspondingly, the user equipment that receives the RRC configuration information may be aware that the transmission beam for the downlink reference signal is the same as the transmission beam for the reference signal indicated for the QCL-type D in the TCI state corresponding to the TCI state ID of the parameter qcl-InfoPeriodicCSI-RS. The user equipment may perform the directional CCA accordingly, and report a result of the CCA to the electronic device on the base station side.

Figure 6:
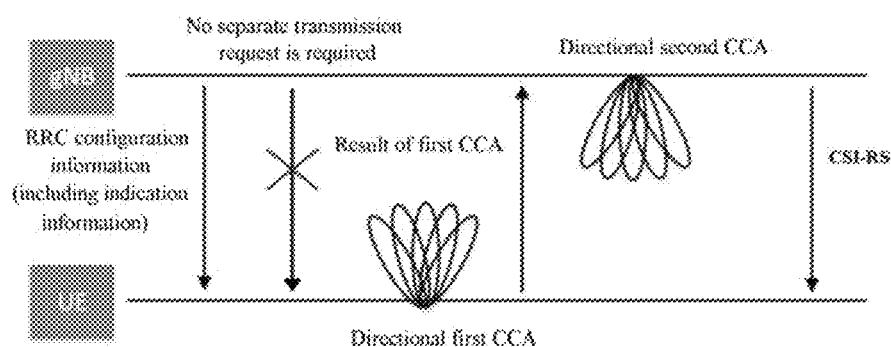
FIG. 6 is a schematic diagram illustrating a wireless communication process including a clear channel assessment that is performed for a periodically transmitted downlink signal by an electronic device according to an embodiment of the present disclosure.

FIG. 6 is a schematic diagram illustrating a wireless communication process including the clear channel assessment that is performed for a periodically transmitted downlink signal by the electronic device according to the embodiment of the present disclosure. In the example shown in FIG. 6, the electronic device 400 described with reference to FIG. 4 serves as a base station gNB, which implements an exemplary process of wireless communication including a clear channel assessment for a periodically transmitted CSI-RS signal, together with the user equipment UE. As shown in FIG. 6, the base station gNB first transmits RRC configuration information to the user equipment UE. The RRC configuration information includes time and frequency resources of the periodically transmitted CSI-RS signal, and further includes the indication information for indicating the transmission beam (for example, a TCI state ID of the parameter qcl-InfoPeriodicCSI-RS in the RRC signaling part NZP-CSI-RS-Resource). After receiving the indication information, the UE can perform, at an appropriate timing based on the RRC configuration information, a directional first clear channel assessment using a corresponding reception beam based on the indication information in the RRC configuration information, without the need for a transmission-request signal as in conventional technology. The UE can report a result of the first clear channel assessment to the base station gNB.

Next, optionally, the base station gNB performs a second clear channel assessment for the corresponding transmission beam, and makes a comprehensive determination according to the result of the first clear channel assessment and the result of the second clear channel assessment, and controls transmission of the CSI-RS signal using the corresponding transmission beam. Note that FIG. 6 shows a situation where the comprehensive determination result indicates that there is a clear channel. In a case that the result indicates that no clear channel exists, the base station gNB does not perform the transmission of the downlink signal shown on the most right in the figure. In addition, for the periodically transmitted CSI-RS signal, after the base station gNB transmits the RRC configuration information to the user equipment UE, the user equipment UE and the base station gNB may periodically perform the processes of performing the first clear channel assessment, reporting the result of the first clear channel assessment, performing the second clear channel assessment, and transmitting the CSI-RS signal, which are not described here.

An example of the periodically transmitted downlink data signal may include a signal based on type 1 in Semi-persistent Scheduling (SPS) PDSCH in the configuration-based Physical downlink shared channel (PDSCH), that is, the signal of SPS-PDSCH Type 1. Such periodically transmitted PDSCH is configured by RRC signaling, and therefore the transmission method of indication information is similar to the above-mentioned periodically transmitted downlink reference signal. That is, the electronic device on the base station side provides, while notifying the user equipment of the predetermined time-domain and frequency-domain resources for transmitting the periodically transmitted downlink data signal through high-layer signaling such as RRC signaling (RRC configuration information), the indication information for indicating the transmission beam for transmitting the downlink data signal, which is not described here.

(2.4.2 Example of Semi-Persistent Downlink Reference Signal)

In this example, a semi-persistent downlink signal is considered. In this case, the downlink signal includes a semi-persistent downlink reference signal, and the provision unit of the electronic device on the base station side may be configured to provide the indication information to the user equipment through an activation request for activating the downlink reference signal.

The semi-persistent downlink reference signal may include a semi-persistent CSI-RS signal. Similar to the periodic CSI-RS signal, the semi-persistent CSI-RS signal is pre-configured with time-domain and frequency-domain resources through RRC signaling, the only difference is that the semi-persistent CSI-RS signal needs to be activated by an activation request of, for example, a Medium Access Control Control Element (MAC CE) for periodically transmission after activation, and the semi-persistent CSI-RS signal is deactivated through the MAC CE when the transmission is not required.

When the electronic device on the base station side performs RRC configuration for the semi-persistent CSI-RS signal, the electronic device may notify the user equipment of predetermined time-domain and frequency-domain resources (which take effect after activation) for transmitting the CSI-RS through high-layer signaling such as RRC signaling (RRC configuration information), and provide candidate-beam indication information at a same time. The candidate-beam indication information indicates, for example, a group of $N_1$ candidate transmission beams available for transmitting the CSI-RS. The candidate-beam indication information may include $N_1$ TCI state IDs for indicating $N_1$ pre-configured candidate transmission beams.

Thereafter, when the base station side transmits an activation request in a form of MAC CE for activating the CSI signal, the provision unit of the electronic device on the base station side may dispose the indication information for indicating the transmission beam to be actually used in the activation request and transmit them to the user equipment together. The indication information may include, for example, $N_2$ TCI state IDs for specifying $N_2$ transmission beams to be actually used from the $N_1$ candidate transmission beams. Here, $N_2$ should be smaller than N1 and may be 8, for example. In the activation request in the form of MAC CE, the $N_2$ TCI state IDs may be included in a TCI field dedicated to beam indication.

Correspondingly, the user equipment receiving such RRC configuration information can know that the transmission beam of the downlink reference signal is the same as the transmission beam used by the reference signals indicated for the QCL-type D in the TCI state corresponding to the TCI state ID in the TCI field in the activation request in the form of MAC CE. The user equipment can perform directional CCA accordingly, and report a result of the CCA to the electronic device on the base station side.

Figure 7:
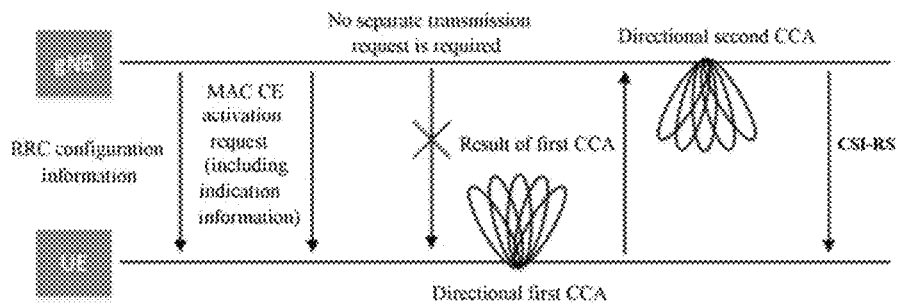
FIG. 7 is a schematic diagram illustrating a wireless communication process including a clear channel assessment that is performed for a semi-persistent downlink reference signal by an electronic device according to an embodiment of the present disclosure.

FIG. 7 is a schematic diagram illustrating a wireless communication process including clear channel assessment that is performed for a semi-persistent downlink reference signal by an electronic device according to an embodiment of the present disclosure. In the example shown in FIG. 7, the electronic device 400 described with reference to FIG. 4 serves as a base station gNB, which implements an exemplary process of wireless communication including a clear channel assessment for a semi-persistent CSI-RS signal together with the user equipment UE. As shown in FIG. 7, the base station gNB first transmits RRC configuration information to the user equipment UE. The RRC configuration information includes time and frequency resources of the semi-persistent CSI-RS signal, and may further include candidate indication information for indicating candidate transmission beams (for example, the above-mentioned $N_1$ TCI state IDs). Next, the base station gNB transmits an activation request in a form of MAC CE when the CSI signal needs to be activated. The activation request includes indication information for indicating the transmission beam to be actually used (for example, the $N_2$ TCI state IDs in the TCI field of the MAC CE). After receiving the activation request, the UE can perform directional first clear channel assessment using the corresponding reception beam based on the indication information in the activation request, without the need for a transmission-request signal as in the conventional technology, and transmit a result of the first clear channel assessment to the base station gNB.

Next, optionally, the base station gNB performs a second clear channel assessment for the corresponding transmission beam, and makes a comprehensive determination according to the result of the first clear channel assessment and the result of the second clear channel assessment, and controls transmission of the CSI-RS signal using the corresponding transmission beam. This part is similar to the example described above with reference to FIG. 6 and is not repeated here. Note that for the semi-persistent CSI-RS signal, after the base station gNB transmits the activation request to the user equipment UE, the user equipment UE and the base station gNB may periodically perform the processes of performing the first clear channel assessment, reporting the result of the first clear channel assessment, performing the second clear channel assessment, and transmitting the CSI-RS signal, which are not described here.

(2.4.3 Example of Non-Periodic Downlink Reference Signal)

In this example, a downlink signal that is transmitted non-periodically is considered. In this case, the downlink signal may include a downlink reference signal or a downlink data signal, which is transmitted non-periodically, and the provision unit of the electronic device may be configured to provide the indication information to the user equipment through a transmission request for requesting transmission of the reference signal or the downlink data signal.

A non-periodically transmitted downlink reference signal is firstly considered. The non-periodically transmitted downlink reference signal may include a non-periodic CSI-RS signal. When the electronic device on the base station side performs RRC configuration for the non-periodic CSI-RS signal, the electronic device does not determine time and frequency resources for the non-periodic CSI-RS signal, but needs to wait for a subsequent scheduling of downlink control information. However, similar to the semi-persistent CSI-RS signaling, the RRC configuration (RRC configuration signal) of the non-periodic CSI-RS signal can also provide candidate-beam indication information, which includes $N_1$ TCI state IDs for indicating $N_1$ pre-configured candidate transmission beams available for transmitting the CSI-RS. As an example, for a non-periodically transmitted CSI-RS signal, a parameter gcl-info for indicating candidate transmission beams may be configured in RRC signaling part CSI-AssociatedReportConfigInfo for configuring a CSI-RS resource set where the CSI-RS signal is located, that is, a group of $N_1$ TCI state IDs corresponding to this parameter are determined.

Thereafter, when the base station side requires the user equipment side to perform the first clear channel assessment, a transmission request may be transmitted to the user equipment for requesting transmission of the non-periodic CSI-RS signal, and the indication information for indicate the actually used transmission beam is included in the transmission request and transmitted to the user equipment together. The transmission request indicates the time and frequency resources for transmitting the non-periodic CSI-RS signal. The indication information in the transmission request may include, for example, $N_2$ TCI state IDs, for specifying $N_2$ transmission beams to be actually used from the $N_1$ candidate transmission beams. Here, $N_2$ should be smaller than $N_1$ and may be 8, for example. The transmission request may be transmitted in a downlink control channel through downlink control information (DCI). The above-mentioned $N_2$ TCI state IDs may be included in a TCI field dedicated to beam indication of DCI format 1-1.

Correspondingly, the user equipment receiving such transmission request may know that the transmission beam of the non-periodic CSI-RS signal is the same as the transmission beam used by the reference signals indicated for the QCL-type D in the TCI state corresponding to the TCI state ID in the TCI field of the DCI format 1-1. The user equipment may perform directional CCA accordingly, and report a result of the CCA to the electronic device on the base station side.

Figure 8:
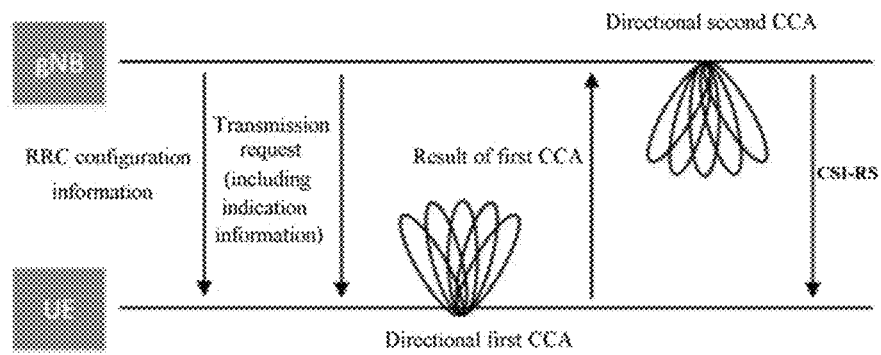
FIG. 8 is a schematic diagram illustrating a wireless communication process including a clear channel assessment that is performed for a non-periodic downlink reference signal by an electronic device according to an embodiment of the present disclosure.

FIG. 8 is a schematic diagram illustrating a wireless communication process including clear channel assessment that is performed for a non-periodic downlink reference signal by an electronic device according to an embodiment of the present disclosure. In the example of FIG. 8, the electronic device 400 described with reference to FIG. 4 serves as a base station gNB, which implements an exemplary process of wireless communication including a clear channel assessment for a semi-persistent CSI-RS signal together with the user equipment UE. As shown in FIG. 8, the base station gNB first transmits RRC configuration information to the user equipment UE. The RRC configuration information includes candidate indication information (for example, the above $N_1$ TCI state IDs) for indicating candidate transmission beams. Next, the base station gNB transmits a transmission request carried by DCI format 1-1 when the CSI-RS signal needs to be transmitted. The transmission request indicates time and frequency resources for transmitting the non-periodic CSI-RS signal, and further includes the indication information (for example, $N_2$ TCI state IDs in the TCI field of DCI format 1-1) indicating the transmission beam to be actually used. After receiving the transmission request, the UE may use the corresponding reception beam to perform directional first clear channel assessment based on the indication information included in the transmission request, and transmit a result of the first clear channel assessment to the base station gNB.

Next, optionally, the base station gNB performs a second clear channel assessment for the corresponding transmission beam, and makes a comprehensive determination according to the result of the first clear channel assessment and the result of the second clear channel assessment, and controls transmission of the CSI-RS signal using the corresponding transmission beam. This part is similar to the example described above with reference to FIG. 6 and is not repeated here.

Next, a downlink data signal that is transmitted non-periodically is considered. The non-periodically transmitted downlink data signal may include scheduling-based PDSCH. Similar to the non-periodic CSI-RS signal, the electronic device on the base station side needs to perform RRC configuration for candidate transmission beams of the scheduling-based PDSCH, and provide candidate-beam indication information through the RRC configuration information. The candidate-beam indication information includes, for example, $N_1$ TCI state IDs indicating $N_1$ preconfigured candidate transmission beams available for transmitting the CSI-RS. After that, when the base station side wants the user equipment side to perform the first clear channel assessment, a transmission request (i.e., downlink control information for scheduling the PDSCH) may be transmitted to the user equipment for requesting transmission of the PDSCH, and the indication information for indicating the actually used transmission beam is included in the transmission request and sent to the user equipment together. The transmission request indicates the time and frequency resources for transmitting the PDSCH. The indication information in the transmission request may include, for example, $N_2$ TCI state IDs, for specifying $N_2$ transmission beams to be actually used from the $N_1$ candidate transmission beams. The transmission request may be transmitted in a downlink control channel through DCI. The above-mentioned $N_2$ TCI state IDs may be included in a TCI field dedicated to beam indication of DCI format 1-1.

Correspondingly, the user equipment receiving such transmission request may know that the transmission beam of the PDSCH is the same as the transmission beam used by the reference signals indicated for the QCL-type D in the TCI state corresponding to the TCI state ID in the TCI field of the DCI format 1-1. The user equipment can perform directional CCA accordingly, and report a result of the CCA to the electronic device on the base station side.

Figure 9:
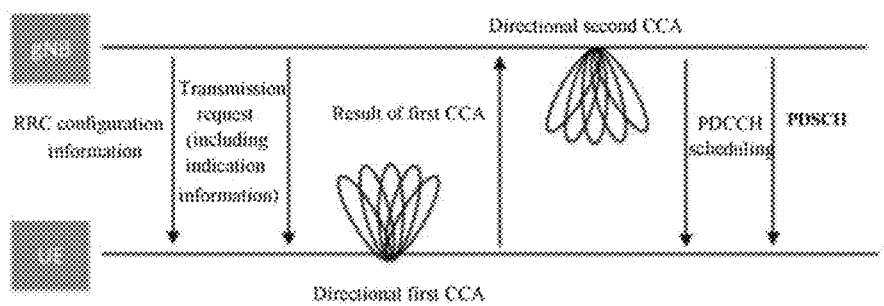
FIG. 9 is a schematic diagram illustrating a wireless communication process including a clear channel assessment that is performed for a non-periodic downlink data signal.

FIG. 9 is a schematic diagram illustrating a wireless communication process including clear channel assessment that is performed for a non-periodic downlink data signal by an electronic device according to an embodiment of the present disclosure. In the example of FIG. 9, the electronic device 400 described with reference to FIG. 4 serves as a base station gNB, which implements an exemplary process of wireless communication including a clear channel assessment for a scheduling-based PDSCH together with the user equipment UE. The example process of FIG. 9 is similar to the example shown in FIG. 8, except that the base station gNB performs the second clear channel assessment, and needs to perform PDCCH scheduling in response to comprehensively determining that there is an clear channel according to the result of the first clear channel assessment and the result of the second clear channel assessment. After that the base station gNB controls to transmit the scheduling-based PDSCH signal using the transmission beam corresponding to the clear channel.

(2.4.4 Example of a Downlink Data Signal that is Preconfigured to be Transmitted Periodically and Time and Frequency Resources for which is Changeable by Downlink Control Information)

Considered in this example is a downlink data signal that is preconfigured to be periodically transmitted and time and frequency resources for which is changeable by downlink control information. In this case, the downlink signal may include a downlink data signal that is preconfigured to be periodically transmitted and time and frequency resources for which is changeable by downlink control information. The provision unit of the electronic device may be configured to: provide initial indication information through high-layer signaling of the downlink data signal, and provide, when there is the downlink control information, additional indication information through the downlink control information as changed indication information.

An example of the above-mentioned downlink data signal that is preconfigured to be periodically transmitted and time and frequency resources for which is changeable includes SPS-PDSCH Type 2 in the configuration-based PDSCH. The SPS-PDSCH Type 2 signal is pre-configured by RRC signaling, but time and frequency resources thereof may be changed by subsequent DCI.

Correspondingly, the provision unit of the electronic device on the base station side may provide the indication information for the SPS-PDSCH Type 2 signal in two ways. A first way is to provide initial indication information through the high-layer signaling such as RRC configuration information of the downlink data signal. The initial indication information is similar to the indication information of the periodic CSI-RS signal discussed in the section "2.4.1 Example of Periodic Downlink Signals". A second way is to provide, when there is the downlink control information for changing the time and frequency resources, additional indication information through the downlink control information as changed indication information. Such downlink control information is similar to the transmission request carried in the DCI for a scheduling-based PDSCH signal that is discussed in the section "2.4.3 Example of non-periodic downlink reference signal". The electronic device on the base station side naturally knows whether the downlink control information for changing the time and frequency resources is subsequently transmitted. The user equipment side can know whether there is such downlink control information carried by the DCI by monitoring the downlink control channel. Therefore, both the electronic device on the base station side and the user equipment can perform appropriate processing based on whether such downlink control information exists.

Figure 10:
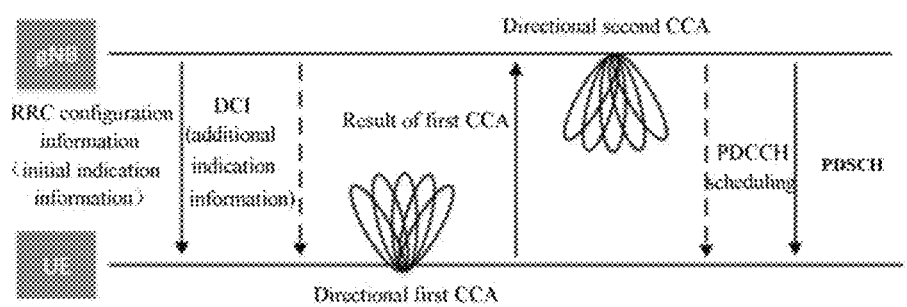
FIG. 10 is a schematic diagram illustrating a wireless communication process including a clear channel assessment that is performed for a downlink data signal by an electronic device according to an embodiment of the present disclosure, wherein the downlink data signal is preconfigured to be transmitted periodically but time and frequency resources for the downlink data signal is changeable by downlink control information.

FIG. 10 is a schematic diagram illustrating a wireless communication process including clear channel assessment that is performed for a downlink data signal by an electronic device according to an embodiment of the present disclosure, wherein the downlink data signal is preconfigured to be periodically transmitted and its time and frequency resources are changeable by downlink control information. In the example shown in FIG. 10, the electronic device 400 described with reference to FIG. 4 serves as a base station gNB, which implements an exemplary process of wireless communication including a clear channel assessment for a semi-persistent SPS-PDSCH Type 2 signal together with the user equipment UE. In the process in FIG. 10, the information interaction part indicated by solid lines corresponds to the case where there is no DCI for changing time and frequency resources and carrying additional indication information, which is similar to the communication process example shown in FIG. 6 for a periodic CSI-RS. In addition, the information interaction part indicated by the solid lines and the information interaction part indicated by dotted lines together constitute the case where there is a DCI for changing the time and frequency resource and carrying additional indication information, which is similar to the communication process example shown in FIG. 9 for a scheduling-based PDSCH signal.

3. Configuration Example of the Electronic Device on the User Equipment Side

Corresponding to the configuration example of the electronic device on the base station side described above, the configuration example of the electronic device on the user equipment side according to an embodiment of the present disclosure is described in detail below.

[3.1 Example configuration of the electronic device of the user equipment]

Figure 11:
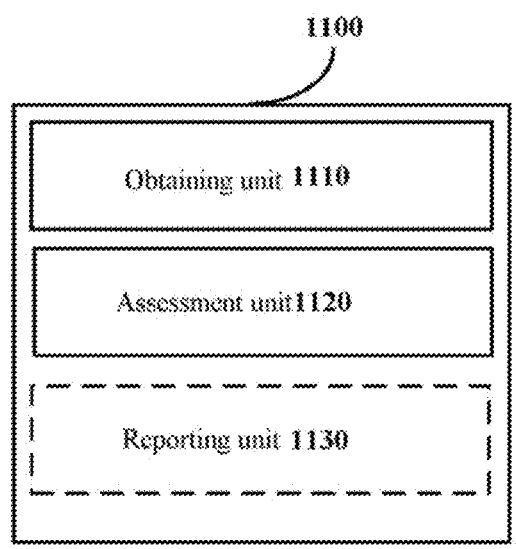
FIG. 11 is a block diagram showing a configuration example of an electronic device on a user equipment side according to an embodiment of the present disclosure.

FIG. 11 is a block diagram showing a configuration example of an electronic device on a user equipment side according to an embodiment of the present disclosure.

As shown in FIG. 11, the electronic device 1100 may include an obtaining unit 1110 and an assessment unit 1120, and an optional reporting unit 1130.

Here, each unit of the electronic device 1100 may be included in a processing circuit. It should be noted that the electronic device 1100 may include a single or multiple processing circuits. Further, the processing circuitry may include various discrete functional units to perform various different functions and/or operations. It should be noted that these functional units may be physical entities or logical entities, and units with different names may be implemented by a same physical entity. Furthermore, the electronic device 1100, for example, the user device itself, or may be implemented as another electronic device attached to the user device.

According to an embodiment of the present disclosure, the obtaining unit 1110 may obtain indication information from a base station, where the indication information indicates a transmission beam for transmitting a downlink signal to the user equipment by the base station. The assessment unit 1120 may perform a first clear channel assessment using a corresponding reception beam based on the indication information.

In a case that beamforming is used for communication, the transmission beam of a transmitter corresponds to the reception beam of the receiver, that is, there is a beam correspondence between the beams. Therefore, using the indication information obtained by the obtaining unit 1110, the assessment unit 1120 of the user equipment 1100 can perform the first clear channel assessment using the reception beam (corresponding reception beam) corresponding to the transmission beam indicated by the indication information. Different from the omnidirectional clear channel assessment performed using omnidirectional reception beams in the conventional technology, the clear channel assessment performed by the user equipment using the corresponding reception beam based on the indication information in the present disclosure is a directional (directive) clear channel assessment.

The assessment unit 1120 may implement the directional first clear channel assessment through various appropriate manners. For example, the assessment unit 1120 may perform a directional (directivity) LBT based on the indication information obtained through the obtaining unit 1110. The user equipment monitors, based on the transmission beam indicated by the indication information, an energy of the corresponding reception beam within a predetermined time period, and determines that a signal is received through the reception beam in response to the energy exceeding a predetermined threshold, and thereby determines that there is no clear channel for the transmission beam indicated by the indication information. On the contrary, the user equipment determines that no signal is received through the reception beam in response to the energy being less than or equal to the predetermined threshold, and thereby determines that there is a clear channel for the transmission beam indicated by the indication information. Such LBT may be specifically implemented through various appropriate manners, such as a manner similar to the Cat.2 LBT mechanism or the Cat.4 LBT mechanism defined by the IEEE standard, which is not limited herein and is not repeated here.

The indication information obtained from the base station by the obtaining unit 1110 may indicate one or more transmission beams for transmitting downlink signals by the base station.

In a case that the indication information obtained by the obtaining unit 1110 indicates the transmission beam for transmitting a downlink signal, the assessment unit 1120 may perform a first clear channel assessment for the transmission beam using the corresponding reception beam, and the optional reporting unit 1130 may report a result of the first clear channel assessment performed for the transmission beam to the base station. In this case, an overhead of the reporting unit 1130 reporting the result to the base station is relatively small, where only one bit may be used to indicate whether a clear channel exists for the transmission beam. Such a report may be transmitted in a PUCCH format that occupies less resource, for example, in a manner similar to a scheduling request (SR).

On another hand, in a case that the indication information obtained by the obtaining unit 1110 indicates multiple transmission beams for transmitting downlink signals, the assessment unit 1120 may perform the first clear channel assessment using a corresponding reception beam for each of the transmission beams for transmitting a downlink signal, and the optional reporting unit 1130 may report a result of the assessment to the base station. In this case, the reporting unit 1130 may report the result to the electronic device in two manners, depending on requirements of the base station for strictness of the clear channel assessment.

A first manner is suitable for a situation where the base station implements strict criteria for the clear channel assessment. The strict criteria refers to that as long as the result of the first clear channel assessment performed by the electronic device 1100 on the user equipment side for any reception beam indicates that no clear channel exists, the base station side determines that the spectrum is not clear currently, that is, no clear channel exists for any of the transmission beams indicated by the indication information. Under such mechanism, only when the result of the first clear channel assessment performed by the assessment unit 1120 for each reception beam indicates existence of a clear channel, the base station side determines that there are clear channels. In this case, the reporting unit 1130 only feeds back an overall result of the clear channel assessment for the multiple transmission beams using one bit. For example, the reporting unit 1130 may determine a positive overall result of the clear channel assessment only when results of the first clear channel assessment for each of the transmission beams all indicate existence of a clear channel, and the result is represented by bit 1; otherwise, the result is represented by bit 0. Such a report may be transmitted in a PUCCH format that occupies less resource, for example, in a manner similar to a scheduling request (SR).

A second manner is suitable for a situation where the base station implements less strict criteria for the clear channel assessment. The less strict refers to that when the result of the first clear channel assessment performed by the assessment unit 1120 of the electronic device 1100 on the user equipment side for a reception beam indicates existence of a clear channel, the base station side determines that the reception beam has an clear channel, regardless of the result of the first clear channel assessment by the assessment unit 1120 for another reception beam. In such case, the reporting unit 1130 reports, to the base station side, results of the first clear channel assessment performed for each of the transmission beams for transmitting downlink signals. Such a report may be transmitted, for example, by a bit sequence of a form $\{1, 0, 1, 1, \ldots, 1\}$. A length of the bit sequence is equal to the number of transmission beams indicated by the indication information obtained by the obtaining unit 1100. Bits in the bit sequence indicate, in a predetermined order, whether there is a clear channel for a corresponding one of the transmission beams by 1 or 0. Such bit sequence is transmitted using a PUCCH format that occupies more resources.

Described above is a configuration example of the electronic device on the user equipment side according to an embodiment of the present disclosure. The electronic device on the user equipment side in this configuration example can perform a clear channel assessment using a corresponding reception beam based on indication information obtained from the base station, and report a result of the clear channel assessment to the base station side, so that the base station can know a determination, observed from the perspective of the reception beam on the user equipment side, of whether there is an clear channel for a transmission beam given by the base station side information.

An example of the indication information obtained by the obtaining unit of the electronic device, such as the above electronic device 1100, on the user equipment side according to the embodiment of the present disclosure may include an RRC parameter capable of indicating a transmission beam. Preferably, the RRC parameter indicates the transmission beam used by a predetermined downlink reference signal by indicating the predetermined downlink reference signal. An example of such an RRC parameter is an ID of a TCI state defined in the Transmission Configuration Indication (TCI) mechanism in 3GPP TS 38.331.

The electronic device on the user equipment side according to a preferred embodiment of the present disclosure is described below. In the embodiment, the assessment unit 1120 and the reporting unit 1130 in the electronic device 1100 as shown in FIG. 11 can implement additional preferred processing. More specifically, in an example, the assessment unit 1120 is further configured to: perform, based on the indication information obtained by the obtaining unit 1110, a third clear channel assessment for a transmission beam for transmitting an uplink signal, which transmission beam corresponds to the reception beam corresponding to the transmission beam indicated by the indication information. In addition, the reporting unit 1130 is further configured to: control, based on a result of the third clear channel assessment from the assessment unit 1120, to report a result of the first clear channel assessment to the base station by using the transmission beam for transmitting the uplink signal.

In this embodiment, in order to ensure successful transmission of the result of the first clear channel assessment from the user equipment 1100 to the base station, the assessment unit 1120 of the user equipment 1100 is optionally configured to perform third clear channel assessment for the transmission beam to transmit the result. The assessment unit 1120 may implement the directional third clear channel assessment in various appropriate manners. For example, the assessment unit 1120 may monitor an energy within a predetermined time period of corresponding reception beam for the transmitting beam for transmitting the uplink signal, and determine that a signal is received by the reception beam in response to the energy exceeding a predetermined threshold, and thereby determine that there is no clear channel for the transmission beam for transmitting the uplink signal; otherwise, it is determined that there is a clear channel for the transmission beam for transmitting the uplink signal. Such LBT may be specifically implemented through various appropriate manners, such as a manner similar to the Cat.2 LBT mechanism or the Cat.4 LBT mechanism defined by the IEEE standard, which is not limited herein and is not repeated here. Correspondingly, the reporting unit 1130 may control, based on the result of the third clear channel assessment by the assessment unit 1120, to report the result of the first clear channel assessment to the base station using the transmission beam for transmitting the uplink signal for which a clear channel exists.

In a further preferred embodiment, the assessment unit 1120 may obtain a similar result of the third clear channel assessment by determining a quasi-co-location relationship without actually performing the third clear channel assessment process when appropriate. This further preferred embodiment is described below with reference to an exemplary case where the indication information obtained by the obtaining unit 1100 includes a TCI state ID as an example.

In this further preferred embodiment, the assessment unit 1120 may be further configured to: determine whether a quasi-co-location relationship is satisfied between the transmission beam for transmitting the downlink reference signal by the base station that is indicated by the indication information (the reception beam corresponding to the transmission beam) and the transmission beam for transmitting the uplink signal by the electronic device on the user equipment side; and use the result of the first clear channel assessment using the corresponding reception beam as the result of the third clear channel assessment for the transmission beam for transmitting the uplink signal, when the quasi-co-location relationship is satisfied.

An exemplary manner in which the assessment unit 1120 determines the quasi-co-location relationship includes, on one hand, checking an index of the previously transmitted reference signal indicated for the QCL-type D of the TCI state included in the indication information obtained by the obtaining unit 1110. As mentioned above, the index of the previously transmitted reference signal may be one CSI-RS or SSB previously transmitted.

On the other hand, the assessment unit 1120 is further required to check beam indication of a to-be-transmitted uplink signal (i.e., the PUCCH signal), that is, the index of the reference signal included in the RRC parameter PUCCH-SpatialRelationInfo of the PUCCH. The index of the reference signal included in the PUCCH-SpatialRelationInfo may include an index of the uplink or downlink reference signal, including SSB, CSI-RS Resource Indicator (CSI) or Sounding Reference Signal (SRI), indicating that the user equipment is advised to use the corresponding beam for receiving/transmitting the downlink/uplink reference signal for uplink transmission.

As an example, in a case that the indexes of the reference signals obtained by the assessment unit 1120 according to the TCI state ID in the indication information and from the RRC parameter PUCCH-SpatialRelationInfo of the to-be-transmitted uplink signal refer to a same previously transmitted reference signal (a same previously transmitted SSB signal), the assessment unit may determine that the quasi-co-location relationship is satisfied between the transmission beam for transmitting the downlink reference signal by the base station that is indicated by the indication information (or the reception beam corresponding to the transmission beam) and the transmission beam for transmitting the uplink signal by the electronic device on the user equipment side. Thereby, the assessment unit 1120 may use the result of the first clear channel assessment performed for the transmission beam (that is, performed using the corresponding reception beam) as the result of the clear channel assessment for the transmission beam for transmitting the uplink signal, without actually performing the third clear channel assessment.

In this way, the assessment process of the assessment unit 1120 may be appropriately simplified.

Next, an example of a manner in which the obtaining unit of the electronic device, such as the electronic device 1100, according to the embodiment of the present disclosure obtains the indication is described in conjunction with a situation where the indication information includes an RRC parameter such as a TCI state ID.

[3.2. Example of a Manner for an Obtaining Unit to Obtain the Indication Information]

(3.2.1 Example of a Periodic Downlink Signal)

In this example, a periodic downlink signal is considered. In this case, the downlink signal may include a downlink reference signal or a downlink data signal, which is preconfigured to be periodically transmitted, and the obtaining unit of the electronic device on the user equipment side may be configured to obtain the indication information to the user equipment through high-layer signaling of the downlink reference signal or the downlink data signal.

First, description is made using an example of the downlink reference signal that is periodically transmitted. The periodically transmitted downlink reference signal may include a periodic CSI-RS and an SSB signal specifically configured for the user equipment. The electronic device on the base station side notifies predetermined time domain and frequency domain resources for transmitting the CSI-RS or SSB through high-layer signaling such as RRC signaling (RRC configuration information), and provide the indication information indicating the transmission beam for transmitting the CSI-RS or SSB at a same time. Correspondingly, the obtaining unit on the user equipment side can obtain the indication information through the high-layer signaling of the downlink reference signal.

As an example, the indication information obtained by the obtaining unit on the user equipment side through the high-layer signaling of the downlink reference signal may include the TCI state ID described above. For a periodically transmitted CSI-RS signal, the obtaining unit may read a parameter qcl-InfoPeriodicCSI-RS for indicating a beam from RRC signaling part NZP-CSI-RS-Resource for configuring a CSI-RS resource set where the CSI-RS signal is located. Correspondingly, the obtaining unit can know that the transmission beam for the downlink reference signal is the same as the transmission beam for the reference signal indicated for the QCL-type D in the TCI state corresponding to the TCI state ID of the parameter qcl-InfoPeriodicCSI-RS. The assessment unit of the user equipment may perform the directional CCA accordingly, and the reporting unit may report a result of the CCA to the electronic device on the base station side.

An example of the periodically transmitted downlink data signal may include SPS-PDSCH Type 1 of the configuration-based PDSCH. Such periodically transmitted PDSCH is configured by RRC signaling, and therefore the transmission method of indication information is similar to the above-mentioned periodically transmitted downlink reference signal. That is, the indication information for indicating the transmission beam for transmitting the downlink data signal is provided simultaneously while the electronic device on the base station side notifying the user equipment of the predetermined time-domain and frequency-domain resources for transmitting the periodically transmitted downlink data signal through high-layer signaling such as RRC signaling. Correspondingly, the obtaining unit on the user equipment side may obtain the corresponding indication information through the high-layer signaling, which is not repeated here.

(3.2.2 Example of Semi-Persistent Downlink Reference Signal)

In this example, a semi-persistent downlink signal is considered. In this case, the downlink signal includes a semi-persistent downlink reference signal, and the obtaining unit of the electronic device on the user equipment side may be configured to obtain the indication information through an activation request for activating the downlink reference signal.

The semi-persistent downlink reference signal may include a semi-persistent CSI-RS signal. For the semi-persistent CSI-RS signal, when the electronic device on the base station side notifies the user equipment of predetermined time-domain and frequency-domain resources (which take effect after activation) for transmitting the CSI-RS through high-layer signaling such as RRC signaling (RRC configuration information), it may simultaneously provide candidate-beam indication information. The candidate-beam indication information indicates, for example, $N_1$ pre-configured candidate transmission beams that may be used for transmitting the CSI-RS. The candidate-beam indication information may include $N_1$ TCI state IDs for indicating $N_1$ pre-configured candidate transmission beams. Optionally, the obtaining unit of the electronic device on the user equipment side may obtain the candidate-beam indication information through high-layer signaling such as RRC signaling.

When the user equipment receives from the base station side an activation request in a form of MAC CE for activating the CSI-RS signal, the activation request may include indication information for indicating the transmission beam to be actually used. The indication information may include, for example, $N_2$ TCI state IDs for specifying $N_2$ transmission beams to be actually used from the $N_1$ candidate transmission beams. Here, $N_2$ should be smaller than N1 and may be 8, for example. In the activation request in the form of MAC CE, the $N_2$ TCI state IDs may be included in a TCI field dedicated to beam indication. Correspondingly, the obtaining unit of the electronic device on the user equipment side may read the TCI state IDs from the TCI field in the activation request in the form of the MAC CE, and know that the transmission beam of the downlink reference signal is the same as the transmission beam used by the reference signals indicated for the QCL-type D in the TCI state corresponding to the TCI state ID. The assessment unit of the user equipment may perform the directional CCA accordingly, and the reporting unit may report a result of the CCA to the electronic device on the base station side.

(3.2.3 Example of Non-Periodic Downlink Reference Signal)

In this example, a downlink signal that is transmitted non-periodically is considered. In this case, the downlink signal may include a downlink reference signal or a downlink data signal, which is transmitted non-periodically, and the obtaining unit of the electronic device on the user equipment side may be configured to obtain the indication information through a transmission request for requesting transmission of the downlink signal.

A non-periodically transmitted downlink reference signal is firstly considered. The non-periodically transmitted downlink reference signal may include a non-periodic CSI-RS signal. Similar to the semi-persistent CSI-RS signaling, the RRC configuration (RRC configuration information) of the non-periodic CSI-RS signal may also provide candidate-beam indication information, which includes $N_1$ TCI state IDs for indicating $N_1$ preconfigured candidate transmission beams. As an example, optionally; the obtaining unit may read the parameter qcl-info for candidate-beam indication from RRC signaling part CSI-AssociatedReportConfigInfo for configuring a CSI-RS resource set where the CSI-RS signal is located, that is, determining a group of $N_1$ TCI state IDs corresponding to the parameter.

When the user equipment receives from the base station a transmission request for requesting transmission of the aperiodic CSI-RS signal, the transmission request may indicate the time and frequency resources for transmitting the non-periodic CSI-RS signal, and include indication information for indicating the transmission beam to be actually used. The indication information in the transmission request may include, for example, $N_2$ TCI state IDs, for specifying $N_2$ transmission beams to be actually used from the $N_1$ candidate transmission beams. Here. $N_2$ should be smaller than $N_1$ and may be 8, for example. The transmission request may be carried by DCI in the downlink control channel. As an example, the obtaining unit can read the $N_2$ TCI state IDs from the TCI field dedicated to beam indication of a DCI format 1-1, and can know that the transmission beam of the non-periodic CSI-RS signal is the same as the transmission beam used by the reference signal indicated for the QCL-type D in the TCI state corresponding to the read TCI state ID. The assessment unit of the user equipment may perform the directional CCA accordingly, and the reporting unit may report a result of the CCA to the electronic device on the base station side.

Next, a downlink data signal that is transmitted non-periodically is considered. The non-periodically transmitted downlink data signal may include scheduling-based PDSCH. Similar to the non-periodic CSI-RS signal, RRC configuration (RRC configuration information) of the scheduling-based PDSCH may also provide candidate-beam indication information, which, for example, includes $N_1$ TCI state IDs indicating $N_1$ pre-configured candidate transmission beams. As an example, optionally, the obtaining unit may read a group of $N_1$ TCI state IDs from a corresponding part of the RRC configuration information for the scheduling-based PDSCH.

When the user equipment receives from the base station a transmission request for requesting transmission of the scheduling-based PDSCH, the transmission request may indicate time and frequency resources for transmitting the scheduling-based PDSCH, and also include indication information for indicating transmission beam to be actually used.

The indication information in the transmission request may include, for example, $N_2$ TCI state IDs, for specifying $N_2$ transmission beams to be actually used from the $N_1$ candidate transmission beams. Here, $N_2$ should be smaller than $N_1$ and may be 8, for example. The transmission request may be carried by DCI in the downlink control channel. As an example, the obtaining unit can read the $N_2$ TCI state IDs from the TCI field dedicated to beam indication of a DCI format 1-1, and may know that the transmission beam of the scheduling-based PDSCH is the same as the transmission beam used by the reference signal indicated for the QCL-type D type in the corresponding TCI state corresponding to the read TCI state ID. The assessment unit of the user equipment may perform the directional CCA accordingly, and the reporting unit may report a result of the CCA to the electronic device on the base station side.

(3.2.4 Example of a Downlink Data Signal that is Preconfigured to be Transmitted Periodically and Time and Frequency Resources for which is Changeable by Downlink Control Information)

Considered in this example is a downlink data signal that is preconfigured to be periodically transmitted and time and frequency resources for which is changeable by downlink control information. In this case, the downlink signal may include downlink data signal that is preconfigured to be periodically transmitted and time and frequency resources for which is changeable by downlink control information. The obtaining unit of the electronic device on the user equipment side may be configured to: obtain initial indication information through high-layer signaling of the downlink data signal, and obtain, when there is the downlink control information, additional indication information through the downlink control information as changed indication information.

An example of the above-mentioned downlink data signal that is preconfigured to be periodically transmitted and time and frequency resources for which is changeable includes SPS-PDSCH Type 2 in the configuration-based PDSCH. The SPS-PDSCH Type 2 signal is pre-configured by RRC signaling, but time and frequency resources thereof may be changed by subsequent DCI.

Correspondingly, the obtaining unit of the electronic device on the user equipment side can obtain the indication information of the SPS-PDSCH Type 2 signal in two ways. A first way is to obtain initial indication information through high-layer signaling of the downlink data signal, such as RRC configuration information. The initial indication information is similar to the indication information of the periodically transmitted CSI-RS signal discussed in the section "3.2.1 Example of Periodic Downlink Signal". A second way is to obtain, when there is the downlink control information for changing the time and frequency resources, additional indication information through the downlink control information as changed indication information. Such downlink control information is similar to the transmission request carried in the DCI for a scheduling-based PDSCH signal that is discussed in the section "3.2.3 Example of non-Periodic downlink reference signal". The user equipment side may know whether there is such downlink control information carried by the DCI through monitoring, and perform appropriate processing based on whether such downlink control information exists, which is not repeated here.

According to embodiments of the present disclosure, the electronic device 200 or 400 on the base station side may interact with the electronic device 1110 on the user equipment side to jointly implement a wireless communication process including the clear channel assessment. The comprehensive content of the electronic device 200 or 400 on the base station side is applicable appropriately to the electronic device 1110 on the user equipment side.

4. Method Example

[4.1] Method Embodiments on the Base Station Side]

A method for wireless communication performed by the electronic device on the base station side (i.e., the electronic device 200 or 400) according to an embodiment of the present disclosure is described in detail below.

Figure 12:
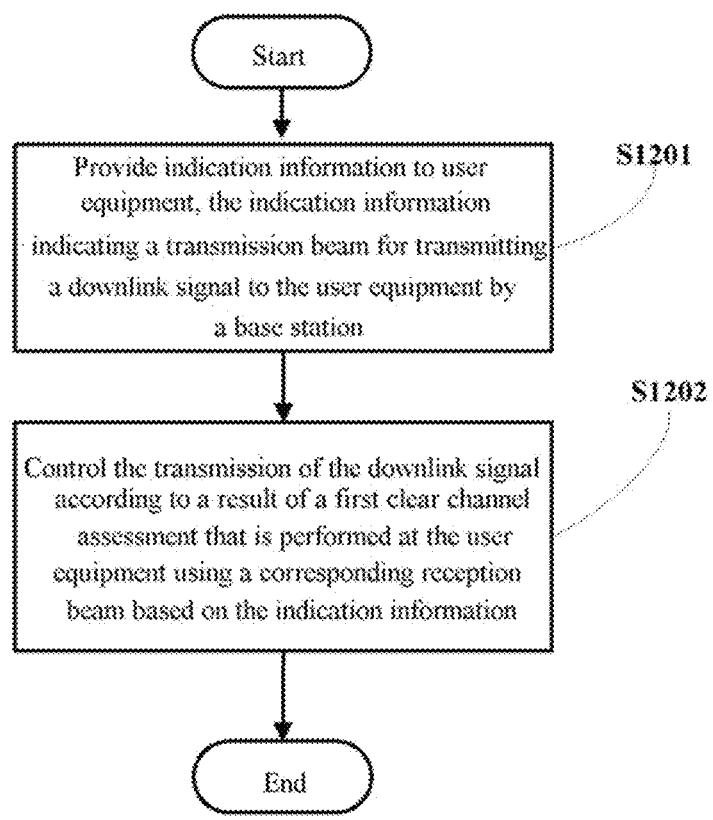
FIG. 12 is a flowchart illustrating a process example of a wireless communication method on the base station side according to an embodiment of the present disclosure.

FIG. 12 is a flowchart showing an exemplary process of a method for wireless communication on a base station side according to an embodiment of the present disclosure.

As shown in FIG. 12, in step S1201, indication information is provided to the user equipment, where the indication information indicates a transmission beam for transmitting a downlink signal to the user equipment by a base station. Next, in step S1202, the transmission of the downlink signal is controlled according to a result of a first clear channel assessment that is performed at the user equipment using a corresponding reception beam based on the indication information.

In an example, the method further includes: for the transmission beam for transmitting the downlink signal, performing a second clear channel assessment using a corresponding reception beam, where the transmission of the downlink signal is controlled according to the result of the first clear channel assessment and a result of the second clear channel assessment.

In this case, in an example, when the result of the first clear channel assessment and/or the result of the second clear channel assessment indicates that there is a clear channel, the downlink signal is transmitted using a transmission beam corresponding to the clear channel.

In an addition example, performing of the second clear channel assessment for the corresponding transmission beam is controlled according to the result of the first clear channel assessment.

In an example, the indication information provided in step S1201 may indicate one or more transmission beams of the electronic device for transmitting downlink signals. When the indication information indicates multiple transmission beams for transmitting downlink signals, the result of the first clear channel assessment includes a result of a first clear channel assessment for each transmission beam for transmitting a downlink signal that is performed using a corresponding reception beam.

In an example, the indication information provided in step S1201 includes an RRC parameter capable of indicating the transmission beam. Preferably, the RRC parameter indicates the transmission beam used by a predetermined downlink reference signal by indicating the predetermined downlink reference signal.

In an example, the downlink signal includes a downlink reference signal or a downlink data signal, which is preconfigured to be transmitted periodically. In this case, the indication information is provided in step S1201 to the user equipment through high-layer signaling of the downlink reference signal or the downlink data signal.

In an example, the downlink signal includes a downlink reference signal that is semi-persistent. In this case, the indication information is provided in step S1201 to the user equipment through an activation request for activating the downlink reference signal.

In an example, the downlink signal includes a downlink reference signal or a downlink data signal, which is preconfigured to be transmitted non-periodically. In this case, the indication information is provided in step S1201 to the user equipment through a transmission request for requesting transmission of the reference signal or the downlink data signal.

In an example, the downlink signal includes a downlink data signal that is preconfigured to be transmitted periodically, where time and frequency resources for the downlink data signal are changeable by downlink control information. In this case, the initial indication information is provided in step S1201 through the high-layer signaling of the downlink data signal, and additional indication information is provided through the downlink control information as changed indication information, when there is the downlink control information.

According to the embodiment of the present disclosure, the execution subject performing the method may be the electronic device 200 or 400 according to the embodiments of the present disclosure. Therefore, various aspects of the foregoing embodiments about the electronic device 200 or 400 are applicable to the method.

[4.2 Method Embodiments on User Equipment Side]

A method for wireless communication performed by an electronic device on a user equipment side (i.e., the electronic device 1100) according to an embodiment of the present disclosure is described in detail below.

Figure 13:
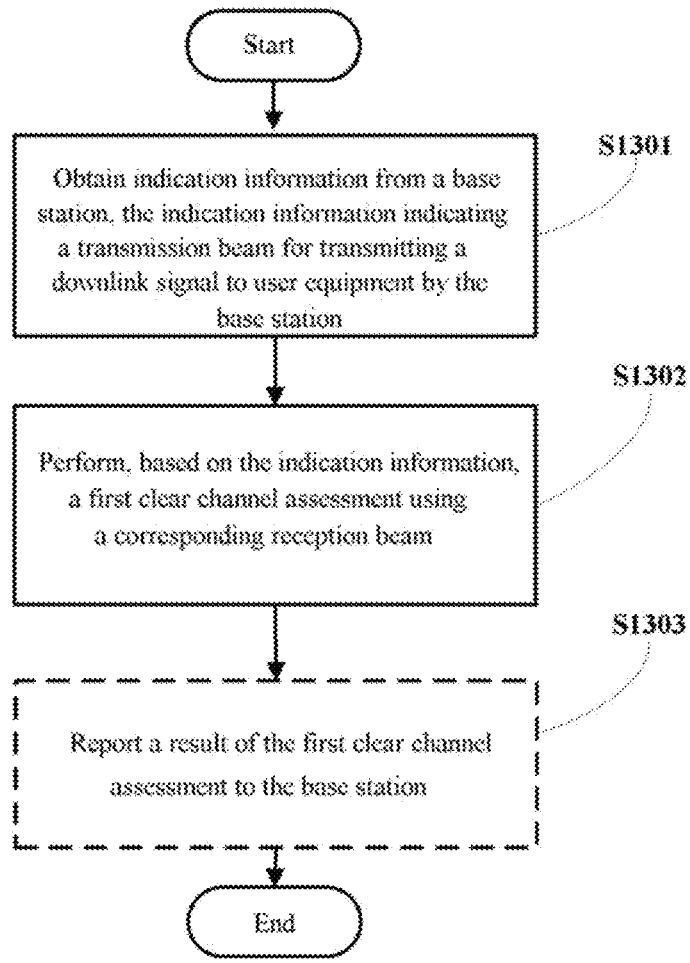
FIG. 13 is a flowchart illustrating an example of a wireless communication method on a user equipment side according to an embodiment of the present disclosure.

FIG. 13 is a flowchart showing an example process of a method for wireless communication on a user equipment side according to an embodiment of the present disclosure.

As shown in FIG. 13, in step S1301, the indication information from the base station is obtained, where the indication information indicates a transmission beam for transmitting a downlink signal to user equipment by the base station. Next, in step S1302, a first clear channel assessment is performed using a corresponding reception beam based on the indication information. In an example, a result of the first clear channel assessment is reported to the base station in optional step S1303.

In an example, the indication information provided in step S1301 may indicate one or more transmission beams of the electronic device for transmitting downlink signals. When the indication information indicates multiple transmission beams for transmitting downlink signals, a first clear channel assessment for each transmission beam for transmitting a downlink signal is performed using a corresponding reception beam in step S1302. In an example, a result of the first clear channel assessment for each transmission beam for transmitting a downlink signal is reported to the base station in step S1303.

In an example, the method further includes: performing, based on the indication information, a third clear channel assessment for a transmission beam for transmitting an uplink signal that corresponds to the corresponding reception beam; and controlling, based on a result of the third clear channel assessment, to report a result of the first clear channel assessment to the base station by using the transmission beam for transmitting the uplink signal.

In this case, in an example, it may be determined whether a quasi-co-location relationship is satisfied between the corresponding reception beam and the transmission beam for transmitting the uplink signal that corresponds to the corresponding reception beam; and the result of the first clear channel assessment using the corresponding reception beam is used as the result of the third clear channel assessment for the transmission beam for transmitting the uplink signal, when the quasi-co-location relationship is satisfied.

In an example, the indication information obtained in step S1301 includes an RRC parameter capable of indicating the transmission beam. Preferably, the RRC parameter indicates the transmission beam used by a predetermined downlink reference signal by indicating the predetermined downlink reference signal.

In an example, the downlink signal includes a downlink reference signal or a downlink data signal which is preconfigured to be transmitted periodically. In this case, the indication information is obtained in step S1301 through high-layer signaling of the downlink reference signal or the downlink data signal.

In an example, the downlink signal includes a downlink reference signal that is semi-persistent. In this case, the indication information is obtained in step S1301 through an activation request for activating the downlink reference signal.

In an example, the downlink signal includes a downlink reference signal or a downlink data signal that is transmitted non-periodically. In this case, the indication information is obtained in step S1301 through a transmission request for requesting transmission of the reference signal or the downlink data signal.

In an example, the downlink signal includes a downlink data signal that is preconfigured to be transmitted periodically, where time and frequency resources for the downlink data signal are changeable by downlink control information. In this case, initial indication information is obtained in step S1301 through high-layer signaling of the downlink data signal, and additional indication information is obtained through the downlink control information as changed indication information, when there is the downlink control information.

According to embodiments of the present disclosure, the execution subject performing the method may be the electronic device 1100 according to the embodiments of the present disclosure. Therefore, various aspects of the foregoing embodiments about the electronic device 1100 are applicable to the method.

5. Application Example

The technology in the present disclosure may be applied to various products.

For example, the electronic device 200 and 400 on the base station side may be implemented as any type of base station device, such as a macro eNB and a small eNB, or may be implemented as any type of gNB (a 5G base station). The small eNB may be an eNB covering a cell smaller than a macro cell, such as a pico eNB, a micro eNB, and a home (femto) eNB. Similar situations may be applied to gNB. Alternatively, the base station may be implemented as any other type of base station, such as a NodeB and a base transceiver station (BTS). The base station may include: a main body (which is also referred to as a base station device) configured to control wireless communication; and one or more remote wireless head ends (RRHs) arranged in different places from the main body.

In addition, the electronic devices 200 and 400 on the base station side may be implemented as any type of TRP. The TRP may have functions of transmitting and receiving, for example, the TRP may receive information from the user equipment and the base station device, and may also transmit information to the user equipment and the base station device. In a typical example, the TRP may serve the user equipment and be controlled by the base station device. Further, the TRP may have a structure similar to that of the base station device, or may only have the structure related to transmitting and receiving information in the base station device.

The electronic device 1100 may be implemented as user equipment. The user equipment may be implemented as a mobile terminal (such as a smart phone, a tablet personal computer (PC), a notebook PC, a portable game terminal, a portable/dongle mobile router, and a digital camera device), or an in-vehicle terminal (such as a car navigation apparatus). The user equipment may be implemented as a terminal for machine-to-machine (M2M) communication (which is also referred to as a machine type communication (MTC) terminal). In addition, the user equipment may be a wireless communication module (such as an integrated circuit module including a single wafer) mounted on each of the above terminal devices.

[Application Examples on Server]

First Application Example

Figure 14:
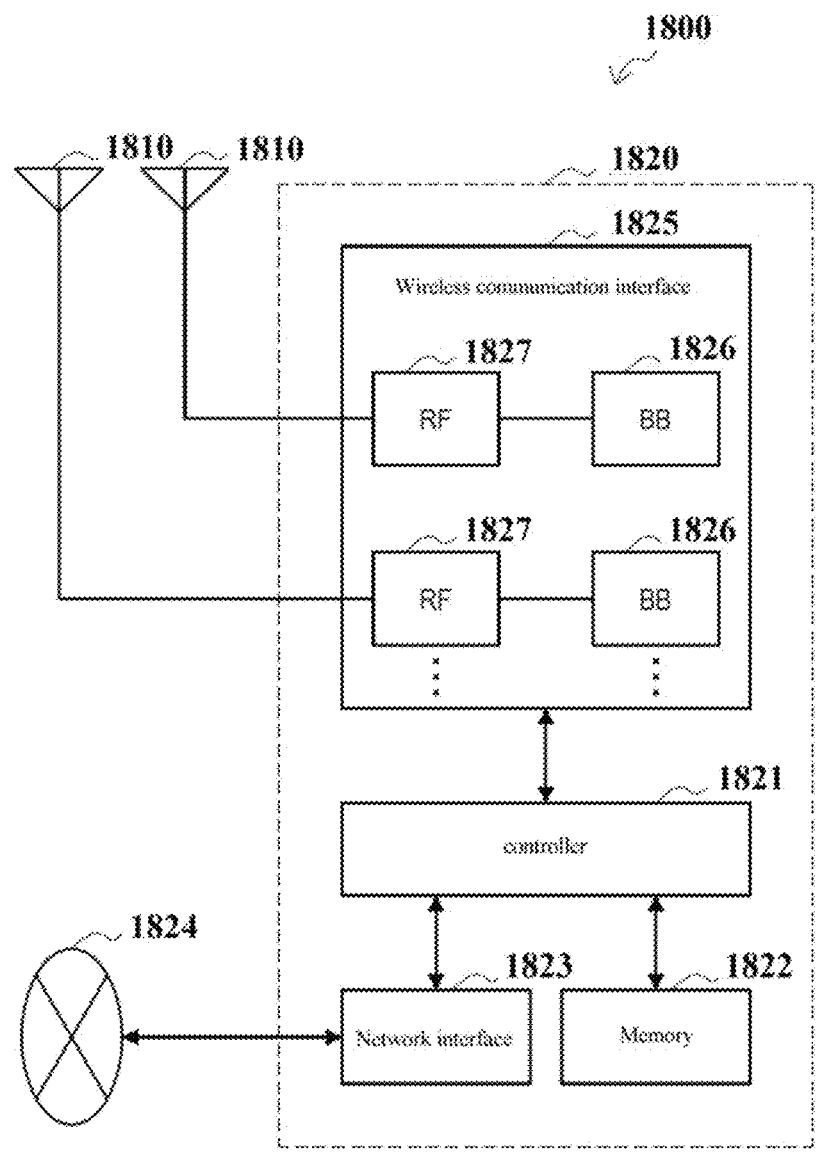
FIG. 14 is a block diagram illustrating a first example of a schematic configuration of an eNB to which techniques of the present disclosure may be applied.

FIG. 14 is a block diagram showing a first example of a schematic configuration of an eNB to which the technology according to the present disclosure may be applied. An eNB 1800 includes one or more antennas 1810 and a base station device 1820. The base station device 1820 and each of the antennas 1810 may be connected to each other via a radio frequency (RF) cable.

Each of the antennas 1810 includes a single or multiple antennal elements (such as multiple antenna elements included in a multiple-input multiple-output (MIMO) antenna), and is used for the base station device 1820 to transmit and receive wireless signals. As shown in FIG. 14, the eNB 1800 may include the multiple antennas 1810. For example, the multiple antennas 1810 may be compatible with multiple frequency bands used by the eNB 1800. Although FIG. 14 shows the example in which the eNB 1800 includes the multiple antennas 1810, the eNB 1800 may include a single antenna 1810.

The base station device 1820 includes a controller 1821, a memory 1822, a network interface 1823, and a wireless communication interface 1825.

The controller 1821 may be, for example, a CPU or a DSP, and operates various functions of a higher layer of the base station device 1820. For example, the controller 1821 generates a data packet from data in signals processed by the wireless communication interface 1825, and transfers the generated packet via the network interface 1823. The controller 1821 may bundle data from multiple base band processors to generate bundled packet, and transfer the generated bundled packet. The controller 1821 may have logical functions of performing control such as wireless resource control, wireless bearer control, mobility management, admission control and scheduling. The control may be performed in corporation with an eNB or a core network node in the vicinity. The memory 1822 includes a RAM and a ROM, and stores a program executed by the controller 1821 and various types of control data (such as a terminal list, transmission power data and scheduling data).

The network interface 1823 is a communication interface for connecting the base station device 1820 to a core network 1824. The controller 1821 may communicate with a core network node or another eNB via the network interface 1823. In this case, the eNB 1800, and the core network node or another eNB may be connected to each other via a logic interface (such as an S1 interface and an X2 interface). The network interface 1823 may also be a wired communication interface or a wireless communication interface for wireless backhaul. If the network interface 1823 is a wireless communication interface, the network interface 1823 may use a higher frequency band for wireless communication than that used by the wireless communication interface 1825.

The wireless communication interface 1825 supports any cellular communication scheme (such as Long Term Evolution (LTE) and LTE-advanced), and provides wireless connection to a terminal located in a cell of the eNB 1800 via the antenna 1810. The wireless communication interface 1825 may typically include, for example, a baseband (BB) processor 826 and an RF circuit 1827. The BB processor 1826 may perform, for example, encoding/decoding, modulating/demodulating, and multiplexing/demultiplexing, and perform various types of signal processing of layers (such as L1, Media Access Control (MAC), Radio Link Control (RLC), and a Packet Data Convergence Protocol (PDCP)). The BB processor 1826 may have a part or all of the above-described logical functions instead of the controller 821. The BB processor 1826 may be a memory storing communication control programs, or a module including a processor and a related circuit configured to execute the programs. Updating the program may allow the functions of the BB processor 1826 to be changed. The module may be a card or a blade inserted into a slot of the base station device 1820. Alternatively, the module may be a chip mounted on the card or the blade. Meanwhile, the RF circuit 1827 may include, for example, a mixer, a filter, and an amplifier, and transmits and receives wireless signals via the antenna 1810.

As shown in FIG. 14, the wireless communication interface 1825 may include multiple BB processors 1826. For example, the multiple BB processors 1826 may be compatible with multiple frequency bands used by the eNB 1800. The wireless communication interface 1825 may include multiple RF circuits 1827, as shown in FIG. 14. For example, the multiple RF circuits 1827 may be compatible with multiple antenna elements. Although FIG. 14 shows the example in which the wireless communication interface 1825 includes multiple BB processors 1826 and multiple RF circuits 1827, the wireless communication interface 1825 may include a single BB processor 1826 and a single RF circuit 1827.

In the eNB 1800 shown in FIG. 14, the provision units 210 and 410 of the electronic devices 200 and 400 described with reference to FIG. 2 and FIG. 4 may be implemented by the wireless communication interface 1825. At least a part of the functions of the control units 220 and 420 of the electronic devices 200 and 400 may be implemented by the controller 1821. For example, the controller 1821 may perform at least part of the functions of the control units 220 and 420 by executing instructions stored in the memory 1822, which is not described in detail here.

Second Application Example

Figure 15:
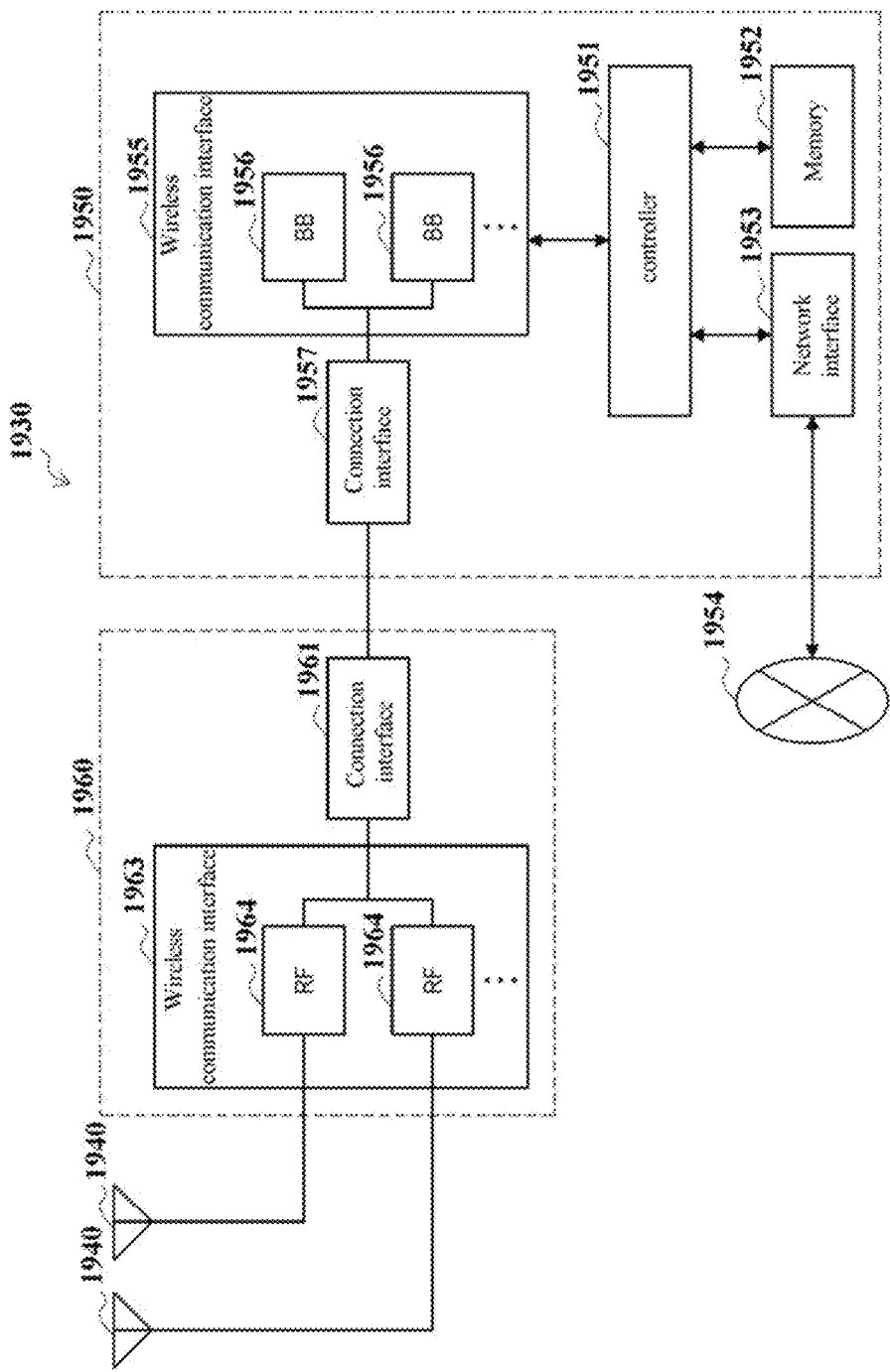
FIG. 15 is a block diagram illustrating a second example of a schematic configuration of an eNB to which techniques of the present disclosure may be applied.

FIG. 15 is a block diagram showing a second example of a schematic configuration of an eNB to which the technology according to the present disclosure may be applied. An eNB 1930 includes one or more antennas 1940, a base station device 1950, and an RRH 1960. The RRH 1960 and each of the antennas 1940 may be connected to each other via an RF cable. The base station device 1950 and the RRH 1960 may be connected to each other via a high speed line such as an optical fiber cable.

Each of the antennas 1940 includes a single or multiple antennal elements (such as multiple antenna elements included in an MIMO antenna), and is used for the RRH 1960 to transmit and receive wireless signals. As shown in FIG. 15, the eNB 1930 may include multiple antennas 1940. For example, the multiple antennas 1940 may be compatible with multiple frequency bands used by the eNB 1930. Although FIG. 15 shows the example in which the eNB 1930 includes multiple antennas 1940, the eNB 1930 may include a single antenna 1940.

The base station device 1950 includes a controller 1951, a memory 1952, a network interface 1953, a wireless communication interface 1955, and a connection interface 1957. The controller 1951, the memory 1952, and the network interface 1953 are the same as the controller 1821, the memory 1822, and the network interface 1823 described with reference to FIG. 14.

The wireless communication interface 1955 supports any cellular communication scheme (such as LTE and LTE-advanced), and provides wireless communication to a terminal located in a sector corresponding to the RRH 1960 via the RRH 1960 and the antenna 1940. The wireless communication interface 1955 may typically include, for example, a BB processor 1956. The BB processor 1956 is the same as the BB processor 1826 described with reference to FIG. 15, except that the BB processor 1956 is connected to an RF circuit 1964 of the RRH 1960 via the connection interface 1957. As show in FIG. 15, the wireless communication interface 1955 may include multiple BB processors 1956. For example, the multiple BB processors 1956 may be compatible with multiple frequency bands used by the eNB 1930. Although FIG. 15 shows the example in which the wireless communication interface 1955 includes multiple BB processors 1956, the wireless communication interface 1955 may include a single BB processor 1956.

The connection interface 1957 is an interface for connecting the base station device 1950 (wireless communication interface 1955) to the RRH 1960. The connection interface 1957 may also be a communication module for communication in the above-described high speed line that connects the base station device 850 (wireless communication interface 1955) to the RRH 1960.

The RRH 1960 includes a connection interface 1961 and a wireless communication interface 1963.

The connection interface 1961 is an interface for connecting the RRH 1960 (wireless communication interface 1963) to the base station device 1950. The connection interface 1961 may also be a communication module for communication in the above-described high speed line.

The wireless communication interface 1963 transmits and receives wireless signals via the antenna 1940. The wireless communication interface 1963 may typically include, for example, an RF circuit 1964. The RF circuit 1964 may include, for example, a mixer, a filter and an amplifier, and transmits and receives wireless signals via the antenna 1940. The wireless communication interface 1963 may include multiple RF circuits 1964, as shown in FIG. 15. For example, the multiple RF circuits 1964 may support multiple antenna elements. Although FIG. 15 shows the example in which the wireless communication interface 1963 includes multiple RF circuits 1964, the wireless communication interface 1963 may include a single RF circuit 1964.

In the eNB 1930 shown in FIG. 15, the provision units 210 and 410 of the electronic devices 200 and 400 described with reference to FIG. 2 and FIG. 4 may be implemented by the wireless communication interface 1963. At least a part of the functions of the control units 220 and 420 of the electronic devices 200 and 400 may be implemented by the controller 1951. For example, the controller 1951 may perform at least part of the functions of the control units 220 and 420 by executing instructions stored in the memory 1952, which is not described in detail here.

[Application Example on User Equipment]

First Application Example

Figure 16:
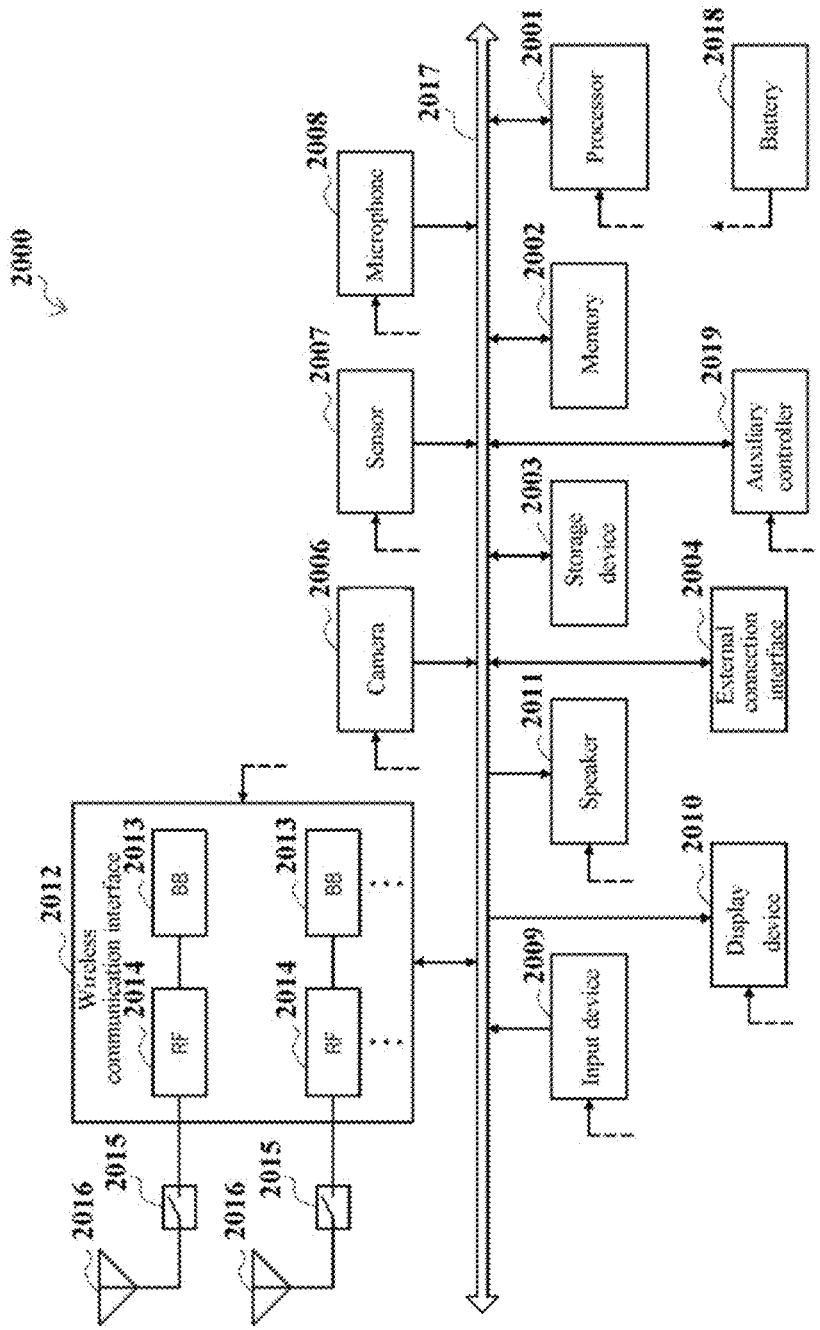
FIG. 16 is a block diagram showing an example of a schematic configuration of a smartphone to which the techniques of the present disclosure can be applied.

FIG. 16 is a block diagram showing an example of a schematic configuration of a smartphone 2000 to which the technology of the present disclosure may be applied. The smartphone 2000 includes a processor 2001, a memory 2002, a storage device 2003, an external connection interface 2004, a camera device 2006, a sensor 2007, a microphone 2008, an input device 2009, a display device 2010, a speaker 2011, a wireless communication interface 2012, one or more antenna switches 2015, one or more antennas 2016, a bus 2017, a battery 2018, and an auxiliary controller 2019.

The processor 2001 may be, for example, a CPU or a system on a chip (SoC), and controls the functions of the application layer and other layers of the smartphone 2000. The memory 2002 includes a RAM and a ROM, and stores data and programs executed by the processor 2001. The storage device 2003 may include a storage medium such as a semiconductor memory and a hard disk. The external connection interface 2004 is an interface for connecting an external device, such as a memory card or a universal serial bus (USB) device, to the smartphone 2000.

The camera device 2006 includes an image sensor (such as a charge coupled device (CCD) and a complementary metal oxide semiconductor (CMOS)), and generates a captured image. The sensor 2007 may include a group of sensors, such as a measurement sensor, a gyroscope sensor, a geomagnetic sensor, and an acceleration sensor. The microphone 2008 converts sound inputted to the smartphone 2000 into an audio signal. The input device 2009 includes, for example, a touch sensor, a keypad, a keyboard, a button, or a switch configured to detect a touch on a screen of the display device 2010, and receives an operation or information inputted from a user. The display device 2010 includes a screen, such as a liquid crystal display (LCD) or an organic light emitting diode (OLED) display, and displays an output image of the smartphone 2000. The speaker 2011 converts the audio signal outputted from the smartphone 2000 into sound.

The wireless communication interface 2012 supports any cellular communication scheme (such as LTE and LTE-Advanced), and performs wireless communication. The wireless communication interface 2012 may generally include, for example, a BB processor 2013 and an RF circuit 2014. The BB processor 2013 may perform, for example, encoding/decoding, modulation/demodulation, and multiplexing/demultiplexing, and perform various types of signal processing for wireless communication. Further, the RF circuit 2014 may include, for example, a mixer, a filter, and an amplifier, and transmit and receive wireless signals via the antenna 2016. The wireless communication interface 2012 may be a chip module on which a BB processor 2013 and an RF circuit 2014 are integrated. As shown in FIG. 16, the wireless communication interface 2012 may include multiple BB processors 2013 and multiple RF circuits 2014. Although FIG. 16 shows an example in which the wireless communication interface 2012 includes multiple BB processors 2013 and multiple RF circuits 2014, the wireless communication interface 2012 may include a single BB processor 2013 or a single RF circuit 2014.

In addition to the cellular communication scheme, the wireless communication interface 2012 may support another type of wireless communication scheme, such as a short-range wireless communication scheme, a near field communication scheme, and a wireless local area network (LAN) scheme. In this case, the wireless communication interface 2012 may include a BB processor 2013 and an RF circuit 2014 for each wireless communication scheme.

Each of the antenna switches 2015 switches a connection destination of the antenna 2016 among multiple circuits (for example, circuits for different wireless communication schemes) included in the wireless communication interface 2012.

Each of the antennas 2016 includes a single or multiple antenna elements (such as multiple antenna elements included in a MIMO antenna), and is used for the wireless communication interface 2012 to transmit and receive wireless signals. As shown in FIG. 16, the smartphone 2000 may include multiple antennas 2016. Although FIG. 16 shows an example in which the smartphone 2000 includes multiple antennas 2016, the smartphone 2000 may include a single antenna 2016.

In addition, the smartphone 2000 may include antenna(s) 2016 for each wireless communication scheme. In this case, the antenna switches 2015 may be omitted from the configuration of the smart phone 2000.

The processor 2001, the memory 2002, the storage device 2003, the external connection interface 2004, the camera device 2006, the sensor 2007, the microphone 2008, the input device 2009, the display device 2010, the speaker 2011, the wireless communication interface 2012, and the auxiliary controller 2019 are connected to each other via the bus 2017. The battery 2018 supplies power to each block of the smartphone 2000 shown in FIG. 16 via a feeder line. The feeder line is partially shown as a dashed line in FIG. 16. The auxiliary controller 2019 operates the minimum necessary functions of the smartphone 2000 in a sleep mode, for example.

In the smartphone 2000 shown in FIG. 16, the obtaining unit 1110 and the reporting unit 1130 of the electronic device 1100 described with reference to FIG. 11 may be implemented by the wireless communication interface 2012. At least part of the functions of the control unit 1120 of the electronic device 1100 may be implemented by the processor 2001 or the auxiliary controller 2019. For example, the processor 2001 or the auxiliary controller 2019 may perform at least part of the functions of the control unit 1120 by executing instructions stored in the memory 2002 or the storage device 2003, which is not described in detail here.

Second Application Example

Figure 17:
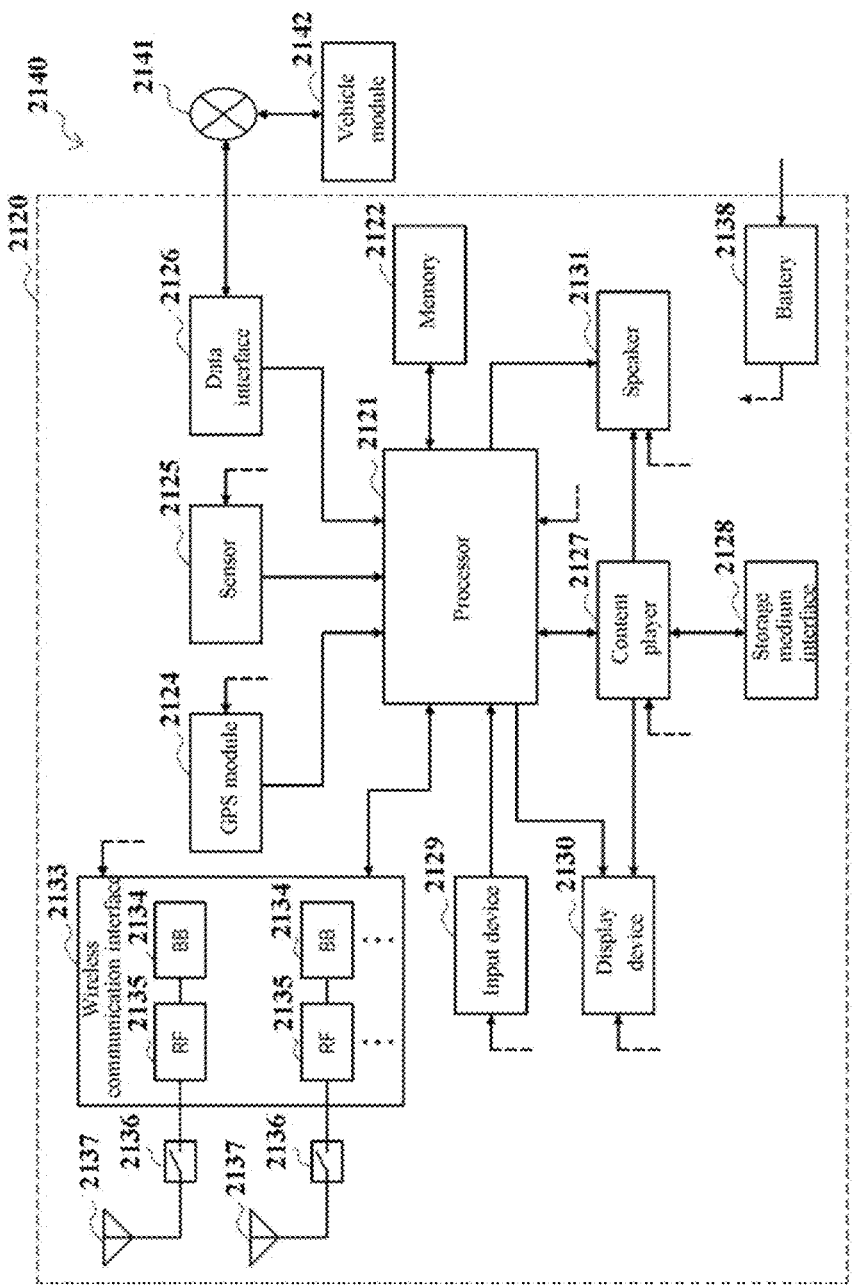
FIG. 17 is a block diagram showing an example of a schematic configuration of a car navigation device to which the techniques of the present disclosure can be applied.

FIG. 17 is a block diagram showing an example of a schematic configuration of a vehicle navigation device 2120 to which the technology of the present disclosure may be applied. The vehicle navigation device 2120 includes a processor 2121, a memory 2122, a global positioning system (GPS) module 2124, a sensor 2125, a data interface 2126, a content player 2127, a storage medium interface 2128, an input device 2129, a display device 2130, a speaker 2131, a wireless communication interface 2133, one or more antenna switches 2136, one or more antennas 2137, and a battery 2138.

The processor 2121 may be, for example, a CPU or SoC, and controls the navigation function of the vehicle navigation device 2120 and other functions. The memory 2122 includes a RAM and a ROM, and stores data and programs executed by the processor 2121.

The GPS module 2124 measures a position (such as latitude, longitude, and altitude) of the vehicle navigation device 2120 based on GPS signals received from GPS satellites. The sensor 2125 may include a group of sensors, such as a gyroscope sensor, a geomagnetic sensor, and an air pressure sensor. The data interface 2126 is connected to, for example, a vehicle-mounted network 2141 via a terminal not shown, and acquires data (such as vehicle speed data) generated by the vehicle.

The content player 2127 reproduces content stored in a storage medium (such as CD and DVD) inserted into the storage medium interface 2128. The input device 2129 includes, for example, a touch sensor configured to detect a touch on a screen of the display device 2130, a button, or a switch, and receives an operation or information inputted from the user. The display device 2130 includes a screen such as an LCD or OLED display, and displays an image of a navigation function or reproduced content. The speaker 2131 outputs a sound of the navigation function or the reproduced content.

The wireless communication interface 2133 supports any cellular communication scheme, such as LTE and LTE-Advanced, and performs wireless communication. The wireless communication interface 2133 may generally include, for example, a BB processor 2134 and an RF circuit 2135. The BB processor 2134 may perform, for example, encoding/decoding, modulation/demodulation, and multiplexing/demultiplexing, and perform various types of signal processing for wireless communication. Further, the RF circuit 2135 may include, for example, a mixer, a filter, and an amplifier, and transmit and receive wireless signals via the antenna 2137. The wireless communication interface 2133 may also be a chip module on which the BB processor 2134 and the RF circuit 2135 are integrated. As shown in FIG. 17, the wireless communication interface 2133 may include multiple BB processors 2134 and multiple RF circuits 2135. Although FIG. 17 shows an example in which the wireless communication interface 2133 includes multiple BB processors 2134 and multiple RF circuits 2135, the wireless communication interface 2133 may include a single BB processor 2134 or a single RF circuit 2135.

In addition to the cellular communication scheme, the wireless communication interface 2133 may support another type of wireless communication scheme, such as a short-range wireless communication scheme, a near field communication scheme, or a wireless LAN scheme. In this case, the wireless communication interface 2133 may include a BB processor 2134 and an RF circuit 2135 for each wireless communication scheme.

Each of the antenna switches 2136 switches a connection destination of the antenna 2137 among multiple circuits, such as circuits for different wireless communication schemes, included in the wireless communication interface 2133.

Each of the antennas 2137 includes a single or multiple antenna elements (such as multiple antenna elements included in a MIMO antenna), and is used for the wireless communication interface 2133 to transmit and receive wireless signals. As shown in FIG. 17, the vehicle navigation device 2120 may include multiple antennas 2137. Although FIG. 17 shows an example in which the vehicle navigation device 2120 includes multiple antennas 2137, the vehicle navigation device 2120 may include a single antenna 2137.

In addition, the vehicle navigation device 2120 may include antenna(s) 2137 for each wireless communication scheme. In this case, the antenna switches 2136 may be omitted from the configuration of the vehicle navigation device 2120.

The battery 2138 supplies power to each block of the vehicle navigation device 2120 shown in FIG. 17 via a feeder line. The feeder line is partially shown as a dashed line in FIG. 17. The battery 2138 accumulates electric power supplied from the vehicle.

In the vehicle navigation device 2120 shown in FIG. 17, the obtaining unit 1110 and the reporting unit 1130 of the electronic device 1100 described with reference to FIG. 11 may be implemented by the wireless communication interface 2133. At least part of the functions of the control unit 1120 of the electronic device 1100 may be implemented by the processor 2121. For example, the processor 2121 may perform at least part of the functions of the control unit 1120 by executing instructions stored in the memory 2122, which is not described in detail here.

The technology of the present disclosure may also be implemented as a vehicle-mounted system (or vehicle) 2140 including one or more blocks in the vehicle navigation device 2120, a vehicle-mounted network 2141, and a vehicle module 2142. The vehicle module 2142 generates vehicle data (such as vehicle speed, engine speed, and failure information), and outputs the generated data to the vehicle-mounted network 2141.

The preferred embodiments of the present disclosure are described above with reference to the drawings, but the present disclosure is not limited to the above examples. Those skilled in the art may make various alternations and modifications within the scope of the claims, and it should be understood that these alternations and modifications shall naturally fall within the technical scope of the present disclosure.

For example, a unit shown by a dashed box in the functional block diagram shown in the drawings indicates that the functional unit is optional in a corresponding device, and optional functional units may be combined with each other in an appropriate manner to achieve a desired function.

For example, multiple functions included in one unit in the above embodiments may be implemented by separate devices. Alternatively, multiple functions implemented by multiple units in the above embodiments may be implemented by separate devices, respectively. In addition, one of the above functions may be implemented by multiple units. Such configuration shall also be included in the technical scope of the present disclosure.

In this specification, the steps described in the flowchart include not only processes performed in time series as the order described, but also processes performed in parallel or individually instead of having to be performed in time series. Further, even in the steps processed in time series, the order may be appropriately changed.

Moreover, the present disclosure may be of the following configuration.

(1) An electronic device, comprising:
processing circuitry configured to:
provide indication information to user equipment, the indication information indicating a transmission beam for transmitting a downlink signal to the user equipment by the electronic device; and
control the transmission of the downlink signal according to a result of a first clear channel assessment that is performed at the user equipment using a corresponding reception beam based on the indication information.

(2) The electronic device according to (1), wherein the processing circuitry is further configured to:
for the transmission beam for transmitting the downlink signal, perform a second clear channel assessment using a corresponding reception beam, and
control the transmission of the downlink signal according to the result of the first clear channel assessment and a result of the second clear channel assessment.

(3) The electronic device according to (2), wherein the processing circuitry is further configured to: when the result of the first clear channel assessment and/or the result of the second clear channel assessment indicates that there is a clear channel, transmit the downlink signal using a transmission beam corresponding to the clear channel.

(4) The electronic device according to (2), wherein the processing circuitry is further configured to: control, according to the result of the first clear channel assessment, to perform the second clear channel assessment for the corresponding transmission beam.

(5) The electronic device according to (1), wherein the indication information indicates one or more transmission beams for transmitting downlink signals by the electronic device.

(6) The electronic device according to (5) wherein when the indication information indicates a plurality of transmission beams for transmitting downlink signals, the result of the first clear channel assessment includes a result of a first clear channel assessment for each transmission beam for transmitting a downlink signal that is performed using a corresponding reception beam.

(7) The electronic device according to (1), wherein the indication information comprises an RRC parameter capable of indicating the transmission beam.

(8) The electronic device according to (7), wherein the RRC parameter indicates the transmission beam used by a predetermined downlink reference signal by indicating the predetermined downlink reference signal.

(9) The electronic device according to (1), wherein
the downlink signal comprises a downlink reference signal or a downlink data signal, which is preconfigured to be transmitted periodically, and
the processing circuitry is further configured to: provide the indication information to the user equipment through high-layer signaling of the downlink reference signal or the downlink data signal.

(10) The electronic device according to (1), wherein
the downlink signal comprises a downlink reference signal that is semi-persistent, and
the processing circuitry is further configured to provide the indication information to the user equipment through an activation request for activating the downlink reference signal.

(11) The electronic device according to (1), wherein
the downlink signal comprises a downlink reference signal or a downlink data signal, which is transmitted non-periodically, and
the processing circuitry is further configured to: provide the indication information to the user equipment through a transmission request for requesting transmission of the reference signal or the downlink data signal.

(12) The electronic device according to (1), wherein
the downlink signal comprises a downlink data signal, wherein the downlink data signal is preconfigured to be transmitted periodically, and time and frequency resources for the downlink data signal are changeable by downlink control information, and the processing circuitry is further configured to:
provide initial indication information through high-layer signaling of the downlink data signal, and
provide, when there is the downlink control information, additional indication information through the downlink control information as changed indication information.

(13) An electronic device, comprising:
processing circuitry configured to:
obtain indication information from a base station, the indication information indicating a transmission beam for transmitting a downlink signal to user equipment by the base station; and
based on the indication information, perform a first clear channel assessment using a corresponding reception beam.

(14) The electronic device according to (11), wherein the indication information indicates one or more transmission beams for transmitting downlink signals by the base station.

(15) The electronic device according to (11), wherein when the indication information indicates a plurality of transmission beams for transmitting downlink signals, the processing circuitry is configured to: perform, using a corresponding reception beam, a first clear channel assessment for each transmission beam for transmitting a downlink signal.

(16) The electronic device according to (14), wherein the processing circuitry is further configured to report to the base station a result of the first clear channel assessment for each transmission beam for transmitting a downlink signal.

(17) The electronic device according to (11), wherein the processing circuitry is further configured to:
perform, based on the indication information, a third clear channel assessment for a transmission beam for transmitting an uplink signal that corresponds to the corresponding reception beam; and
control, based on a result of the third clear channel assessment, to report a result of the first clear channel assessment to the base station by using the transmission beam for transmitting the uplink signal.

(18) The electronic device according to (17), wherein the processing circuitry is further configured to:
determine whether a quasi-co-location relationship is satisfied between the corresponding reception beam and the transmission beam for transmitting the uplink signal that corresponds to the corresponding reception beam; and
when the quasi-co-location relationship is satisfied, use the result of the first clear channel assessment using the corresponding reception beam as the result of the third clear channel assessment for the transmission beam for transmitting the uplink signal.

(19) The electronic device according to (13), wherein the indication information comprises an RRC parameter capable of indicating the transmission beam.

(20) The electronic device according to (19), wherein the RRC parameter indicates the transmission beam used by a predetermined downlink reference signal by indicating the predetermined downlink reference signal.

(21) The electronic device according to (13), wherein the downlink signal comprises a downlink reference signal or a downlink data signal, which is preconfigured to be transmitted periodically, and
the processing circuitry is further configured to obtain the indication information through high-layer signaling of the downlink reference signal or the downlink data signal.

(22) The electronic device according to (13), wherein,
the downlink signal comprises a downlink reference signal that is semi-persistent, and
the processing circuitry is further configured to obtain the indication information through an activation request for activating the downlink reference signal.

(23) The electronic device according to (13), wherein
the downlink signal comprises a downlink reference signal or a downlink data signal, which is transmitted non-periodically, and
the processing circuitry is further configured to obtain the indication information through a transmission request for requesting transmission of the downlink signal.

(24) The electronic device according to (13), wherein
the downlink signal comprises a downlink data signal, wherein the downlink data signal is preconfigured to be transmitted periodically, and time and frequency resources for the downlink data signal are changeable by downlink control information, and
the processing circuitry is further configured to:
obtain initial indication information through high-layer signaling of the downlink data signal, and
obtain, when there is the downlink control information, additional indication information through the downlink control information as changed indication information.

(25) A method for wireless communication, the method comprising:
providing indication information to user equipment, the indication information indicating a transmission beam for transmitting a downlink signal to the user equipment by a base station; and
controlling the transmission of the downlink signal according to a result of a first clear channel assessment that is performed at the user equipment using a corresponding reception beam based on the indication information.

(26) The method according to (25), further comprising:
for the transmission beam for transmitting the downlink signal, performing a second clear channel assessment using a corresponding reception beam, wherein
the transmission of the downlink signal is controlled according to the result of the first clear channel assessment and a result of the second clear channel assessment.

(27) The method according to (26), wherein
when the result of the first clear channel assessment and/or the result of the second clear channel assessment indicates that there is a clear channel, the downlink signal is transmitted using a transmission beam corresponding to the clear channel.

(28) The method according to (27), wherein
performing of the second clear channel assessment for the corresponding transmission beam is controlled according to the result of the first clear channel assessment.

(29) A method for wireless communication, the method comprising:
obtaining indication information from a base station, the indication information indicating a transmission beam for transmitting a downlink signal to user equipment by the base station; and based on the indication information, performing a clear channel assessment using a corresponding reception beam.

(30) The method according to (29), wherein the indication information indicates one or more transmission beams for transmitting downlink signals by the base station.

(31) The method according to (29), wherein when the indication information indicates a plurality of transmission beams for transmitting downlink signals, a first clear channel assessment for each transmission beam for transmitting a downlink signal is performed using a corresponding reception beam.

(32) The method according to (31), further comprising:
reporting, to the base station, a result of the first clear channel assessment for each transmission beam for transmitting a downlink signal.

(33) The method according to (29), further comprising:
performing, based on the indication information, a third clear channel assessment for a transmission beam for transmitting an uplink signal that corresponds to the corresponding reception beam; and
controlling, based on a result of the third clear channel assessment, to report a result of the first clear channel assessment to the base station by using the transmission beam for transmitting the uplink signal.

(34) The method according to (33), further comprising:
determining whether a quasi-co-location relationship is satisfied between the corresponding reception beam and the transmission beam for transmitting the uplink signal that corresponds to the corresponding reception beam, wherein
when the quasi-co-location relationship is satisfied, the result of the first clear channel assessment using the corresponding reception beam is used as the result of the third clear channel assessment for the transmission beam for transmitting the uplink signal.

(35) A non-transitory computer-readable storage medium storing a program that, when executed by a processor, causes the processor to perform the method according to any one of (25) or (34).

Although the embodiments of the present disclosure have been described above in detail in connection with the drawings, it shall be appreciated that the embodiments as described above are merely illustrative and are not intended to limit the present disclosure. Various modifications and variations may be made to the above embodiments by those skilled in the art, without departing from the spirit and scope of the present disclosure. Therefore, the scope of the present disclosure is defined merely by appended claims and equivalents thereof.

The invention claimed is:

1. An electronic device, comprising:
processing circuitry configured to:
provide indication information to user equipment, the indication information indicating a transmission beam for transmitting a downlink signal to the user equipment by the electronic device; and
control the transmission of the downlink signal according to a result of a first clear channel assessment that is performed at the user equipment using a corresponding reception beam based on the indication information,
wherein the processing circuitry is further configured to:
for the transmission beam for transmitting the downlink signal, perform a second clear channel assessment using a corresponding reception beam, and
control the transmission of the downlink signal according to the result of the first clear channel assessment and a result of the second clear channel assessment.

2. The electronic device according to claim 1, wherein the processing circuitry is further configured to: when the result of the first clear channel assessment or the result of the second clear channel assessment indicates that there is a clear channel, transmit the downlink signal using a transmission beam corresponding to the clear channel.

3. The electronic device according to claim 1, wherein the processing circuitry is further configured to: control, according to the result of the first clear channel assessment, to perform the second clear channel assessment for the corresponding transmission beam.

4. The electronic device according to claim 1, wherein the indication information comprises an RRC parameter capable of indicating the transmission beam.

5. The electronic device according to claim 4, wherein the RRC parameter indicates the transmission beam used by a predetermined downlink reference signal by indicating the predetermined downlink reference signal.

6. The electronic device according to claim 1, wherein
the downlink signal comprises a downlink reference signal or a downlink data signal, which is preconfigured to be transmitted periodically, and
the processing circuitry is further configured to: provide the indication information to the user equipment through high-layer signaling of the downlink reference signal or the downlink data signal.

7. The electronic device according to claim 1, wherein
the downlink signal comprises a downlink reference signal that is semi-persistent, and
the processing circuitry is further configured to provide the indication information to the user equipment through an activation request for activating the downlink reference signal.

8. The electronic device according to claim 1, wherein
the downlink signal comprises a downlink reference signal or a downlink data signal, which is transmitted non-periodically, and
the processing circuitry is further configured to: provide the indication information to the user equipment through a transmission request for requesting transmission of the reference signal or the downlink data signal.

9. The electronic device according to claim 1, wherein
the downlink signal comprises a downlink data signal, wherein the downlink data signal is preconfigured to be transmitted periodically, and time and frequency resources for the downlink data signal are changeable by downlink control information, and
the processing circuitry is further configured to:
provide initial indication information through high-layer signaling of the downlink data signal, and
provide, when there is the downlink control information, additional indication information through the downlink control information as changed indication information.

10. An electronic device, comprising:
processing circuitry configured to:
obtain indication information from a base station, the indication information indicating a transmission beam for transmitting a downlink signal to user equipment by the base station; and
based on the indication information, perform a first clear channel assessment using a corresponding reception beam, wherein
the downlink signal comprises a downlink data signal, wherein the downlink data signal is preconfigured to be transmitted periodically, and time and frequency resources for the downlink data signal are changeable by downlink control information, and
the processing circuitry is further configured to:
obtain initial indication information through high-layer signaling of the downlink data signal, and
obtain, when there is the downlink control information, additional indication information through the downlink control information as changed indication information.

11. The electronic device according to claim 8, wherein the processing circuitry is further configured to:
perform, based on the indication information, a third clear channel assessment for a transmission beam for transmitting an uplink signal that corresponds to the corresponding reception beam; and
control, based on a result of the third clear channel assessment, to report a result of the first clear channel assessment to the base station by using the transmission beam for transmitting the uplink signal.

12. The electronic device according to claim 11, wherein the processing circuitry is further configured to:
determine whether a quasi-co-location relationship is satisfied between the corresponding reception beam and the transmission beam for transmitting the uplink signal that corresponds to the corresponding reception beam; and
when the quasi-co-location relationship is satisfied, use the result of the first clear channel assessment using the corresponding reception beam as the result of the third clear channel assessment for the transmission beam for transmitting the uplink signal.

13. The electronic device according to claim 10, wherein the indication information comprises an RRC parameter capable of indicating the transmission beam.

14. The electronic device according to claim 13, wherein the RRC parameter indicates the transmission beam used by a predetermined downlink reference signal by indicating the predetermined downlink reference signal.

15. The electronic device according to claim 10, wherein
the downlink signal comprises a downlink reference signal or a downlink data signal, which is preconfigured to be transmitted periodically, and
the processing circuitry is further configured to obtain the indication information through high-layer signaling of the downlink reference signal or the downlink data signal.

16. The electronic device according to claim 10, wherein,
the downlink signal comprises a downlink reference signal that is semi-persistent, and
the processing circuitry is further configured to obtain the indication information through an activation request for activating the downlink reference signal.

17. The electronic device according to claim 10, wherein
the downlink signal comprises a downlink reference signal or a downlink data signal, which is transmitted non-periodically, and
the processing circuitry is further configured to obtain the indication information through a transmission request for requesting transmission of the downlink signal.

18. A method for wireless communication, the method performed by an electronic device and comprising:
providing indication information to user equipment, the indication information indicating a transmission beam for transmitting a downlink signal to the user equipment by a base station; and
controlling the transmission of the downlink signal according to a result of a first clear channel assessment that is performed at the user equipment using a corresponding reception beam based on the indication information,
wherein the method further comprises:
for the transmission beam for transmitting the downlink signal, performing a second clear channel assessment using a corresponding reception beam, and
controlling the transmission of the downlink signal according to the result of the first clear channel assessment and a result of the second clear channel assessment.

* * * * *